United States Patent
Yamamoto

(10) Patent No.: US 12,511,762 B2
(45) Date of Patent: Dec. 30, 2025

(54) LEARNING MODEL GENERATION METHOD, INFORMATION PROCESSING DEVICE, AND INFORMATION PROCESSING SYSTEM

(71) Applicant: SONY GROUP CORPORATION, Tokyo (JP)

(72) Inventor: Yuki Yamamoto, Tokyo (JP)

(73) Assignee: SONY GROUP CORPORATION, Tokyo (JP)

(\*) Notice: Subject to any disclaimer, the term of this patent is extended or adjusted under 35 U.S.C. 154(b) by 298 days.

(21) Appl. No.: 18/005,902

(22) PCT Filed: Jul. 16, 2021

(86) PCT No.: PCT/JP2021/026739
§ 371 (c)(1),
(2) Date: Jan. 18, 2023

(87) PCT Pub. No.: WO2022/024803
PCT Pub. Date: Feb. 3, 2022

(65) Prior Publication Data
US 2023/0289980 A1 Sep. 14, 2023

(30) Foreign Application Priority Data
Jul. 31, 2020 (JP) .................... 2020-129878

(51) Int. Cl.
*G06T 7/246* (2017.01)
*G06V 10/77* (2022.01)

(52) U.S. Cl.
CPC .......... *G06T 7/248* (2017.01); *G06V 10/7715* (2022.01); *G06T 2207/20081* (2013.01)

(58) Field of Classification Search
CPC .......... G06T 7/248; G06T 2207/20081; G06V 10/7715; G06V 10/62; G06V 20/58; G06N 20/00; G08G 1/00
See application file for complete search history.

(56) References Cited

U.S. PATENT DOCUMENTS

2020/0160550 A1\* 5/2020 Hunt .................... G06V 10/44

FOREIGN PATENT DOCUMENTS

| JP | 4389956 B2 | 12/2009 |
|----|------------|---------|
| JP | 2019-152976 A | 9/2019 |

OTHER PUBLICATIONS

Yilmaz, A., Javed, O. and Shah, M., 2006. Object tracking: A survey. Acm computing surveys (CSUR), 38(4), pp. 13-es.\*

(Continued)

*Primary Examiner* — Zhitong Chen
(74) *Attorney, Agent, or Firm* — CHIP LAW GROUP

(57) ABSTRACT

The present technology relates to a learning model generation method, an information processing device, and an information processing system capable of constructing a recognizer with less erroneous detection. A target object is tracked in a reverse direction in time series, the target object being recognized by recognition processing using a recognizer to which a learning model for performing recognition processing on input data is applied, and relearning of the learning model is performed by using data generated on the basis of a result of the tracking. The data is generated by tracking the target object in the reverse direction in time series and adding a label to the target object tracked. The present technology can be applied to, for example, an information processing device that performs relearning of a recognizer that recognizes a predetermined object.

16 Claims, 20 Drawing Sheets

(56) References Cited

OTHER PUBLICATIONS

Sethi, I.K. and Jain, R., 1987. Finding trajectories of feature points in a monocular image sequence. IEEE Transactions on pattern analysis and machine intelligence, (1), pp. 56-73.*
International Search Report and Written Opinion of PCT Application No. PCT/JP2021/026739, issued on Sep. 21, 2021, 09 pages of ISRWO.

* cited by examiner

LEARNING MODEL GENERATION METHOD, INFORMATION PROCESSING DEVICE, AND INFORMATION PROCESSING SYSTEM

CROSS REFERENCE TO RELATED APPLICATIONS

This application is a U.S. National Phase of International Patent Application No. PCT/JP2021/026739 filed on Jul. 16, 2021, which claims priority benefit of Japanese Patent Application No. JP 2020-129878 filed in the Japan Patent Office on Jul. 31, 2020. Each of the above-referenced applications is hereby incorporated herein by reference in its entirety.

TECHNICAL FIELD

The present technology relates to a learning model generation method, an information processing device, and an information processing system, and relates to, for example, a learning model generation method, an information processing device, and an information processing system that execute processing relating to relearning of a recognizer used for recognition processing.

BACKGROUND ART

Various proposals have been made on techniques for recognizing a predetermined object such as a person or a car. For example, Patent Document 1 proposes a technique for continuously detecting the same person even in a situation where the face swings up, down, left, and right or the size of the face changes in each frame.

CITATION LIST

Patent Document

Patent Document 1: Japanese Patent No. 4389956

SUMMARY OF THE INVENTION

Problems to be Solved by the Invention

In a case where recognition of a predetermined object such as a person or a car is performed using a recognizer learned in advance, there is a possibility that erroneous recognition is performed in a case where a similar case to a case where erroneous recognition has been performed before occurs. It is desired to improve the performance of the recognizer so that erroneous recognition is not repeated.

The present technology has been made in view of such a situation, and an object thereof is to enable improvement of performance of a recognizer.

Solutions to Problems

A learning model generation method according to one aspect of the present technology include tracking a target object in a reverse direction in time series, the target object being recognized by recognition processing using a recognizer to which a learning model for performing recognition processing on input data is applied, and performing relearning of the learning model by using data generated on the basis of a result of the tracking.

An information processing device according to one aspect of the present technology includes a relearning unit that tracks a target object recognized by recognition processing using a recognizer in a reverse direction in time series, and performs relearning of a learning model of the recognizer on the basis of learning data for relearning of the recognizer generated on the basis of a result of the tracking.

An information processing system according to one aspect of the present technology includes a recognition processing unit that performs recognition processing using a recognizer to which a learning model for performing recognition processing on input data is applied, an extraction unit that extracts a recognition result that satisfies a predetermined criterion among recognition results recognized by the recognition processing unit, a tracking unit that sets the recognition result extracted by the extraction unit as a target object and tracks the target object in a reverse direction in time series, a label adding unit that adds a label to the target object tracked by the tracking unit, and a relearning unit that performs relearning of the learning model by using the label added by the label adding unit, and an update unit that updates the recognizer of the recognition processing unit with the learning model of which the relearning has been performed by the relearning unit.

In the learning model generation method according to one aspect of the present technology, a target object is tracked in a reverse direction in time series, the target object being recognized by recognition processing using a recognizer to which a learning model for performing recognition processing on input data is applied, and relearning of the learning model is performed by using data generated on the basis of a result of the tracking.

In the information processing device according to one aspect of the present technology, a target object recognized by recognition processing using a recognizer is tracked in a reverse direction in time series, and relearning of a learning model of the recognizer is performed on the basis of learning data for relearning of the recognizer generated on the basis of a result of the tracking.

In the information processing system according to one aspect of the present technology, recognition processing using a recognizer to which a learning model for performing recognition processing on input data is applied is performed, a recognition result that satisfies a predetermined criterion among recognition results recognized is extracted, the recognition result extracted is set as a target object, the target object is tracked in a reverse direction in time series, a label is added to the target object tracked, and relearning of the learning model is performed by using the label added, and the recognizer is updated with the learning model of which the relearning has been performed.

Note that the information processing device may be an independent device or an internal block constituting one device.

MODE FOR CARRYING OUT THE INVENTION

Hereinafter, modes for carrying out the present technology (hereinafter referred to as embodiments) will be described.

Configuration Example of Vehicle Control System

Figure 1:
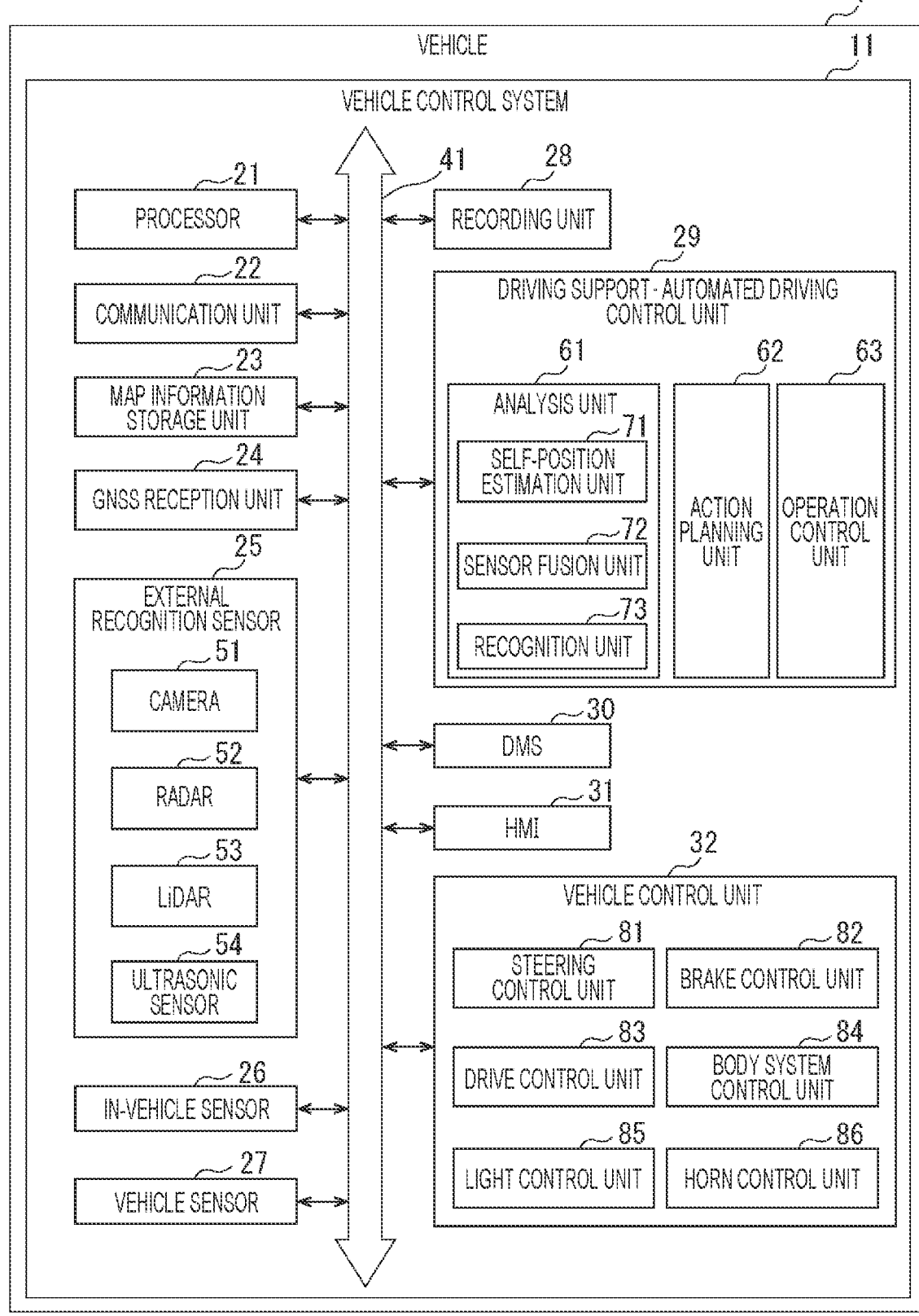
FIG. 1 is a block diagram illustrating a configuration example of a vehicle control system.

FIG. 1 is a block diagram illustrating a configuration example of a vehicle control system 11 that is an example of a mobile device control system to which the present technology is applied.

The vehicle control system 11 is provided in a vehicle 1 and performs processing related to driving support and automated driving of the vehicle 1.

The vehicle control system 11 includes a processor 21, a communication unit 22, a map information storage unit 23, a global navigation satellite system (GNSS) reception unit 24, an external recognition sensor 25, an in-vehicle sensor 26, a vehicle sensor 27, a recording unit 28, a driving support-automated driving control unit 29, a driver monitoring system (DMS) 30, a human machine interface (HMI) 31, and a vehicle control unit 32.

The processor 21, the communication unit 22, the map information storage unit 23, the GNSS reception unit 24, the external recognition sensor 25, the in-vehicle sensor 26, the vehicle sensor 27, the recording unit 28, the driving support-automated driving control unit 29, the driver monitoring system (DMS) 30, the human machine interface (HMI) 31, and the vehicle control unit 32 are connected to each other via the communication network 41. The communication network 41 is formed by, for example, an in-vehicle communication network, a bus, or the like that conforms to any standard such as controller area network (CAN), local interconnect network (LIN), local area network (LAN), FlexRay (registered trademark), Ethernet (registered trademark), or the like. Note that each part of the vehicle control system 11 may be directly connected by, for example, short-range wireless communication (Near Field Communication (NFC)) or Bluetooth (registered trademark) or the like without going through the communication network 41.

Note that, hereinafter, in a case where each unit of the vehicle control system 11 performs communication via the communication network 41, description of the communication network 41 is omitted. For example, in a case where the processor 21 and the communication unit 22 communicate with each other via the communication network 41, it is described that the processor 21 and the communication unit 22 simply communicate with each other.

The processor 21 includes various processors such as a central processing unit (CPU), a micro processing unit (MPU), and an electronic control unit (ECU), for example. The processor 21 controls the entire vehicle control system 11.

The communication unit 22 communicates with various devices inside and outside the vehicle, other vehicles, servers, base stations, and the like, and transmits and receives various data. As for communication with the outside of the vehicle, for example, the communication unit 22 receives a program for updating software for controlling the operation of the vehicle control system 11, map information, traffic information, information of surroundings of the vehicle 1, and the like from the outside. For example, the communication unit 22 transmits information regarding the vehicle 1 (for example, data indicating the state of the vehicle 1, a recognition result by a recognition unit 73, or the like), information of surroundings of the vehicle 1, and the like to the outside. For example, the communication unit 22 performs communication corresponding to a vehicle emergency call system such as eCall.

Note that the communication method of the communication unit 22 is not particularly limited. Furthermore, a plurality of communication methods may be used.

As for communication with the inside of the vehicle, for example, the communication unit 22 wirelessly communicates with a device in the vehicle by a communication method such as wireless LAN, Bluetooth (registered trademark), NFC, or wireless USB (WUSB). For example, the communication unit 22 performs wired communication with a device in the vehicle by a communication method such as Universal Serial Bus (USB), High-Definition Multimedia Interface (HDMI, registered trademark), or Mobile High-definition Link (MHL) via a connection terminal (and a cable if necessary) that is not illustrated.

Here, the device in the vehicle is, for example, a device that is not connected to the communication network 41 in the vehicle. For example, a mobile device and a wearable device possessed by an occupant such as a driver, an information device brought into the vehicle and temporarily installed, and the like are assumed.

For example, the communication unit 22 communicates, by a wireless communication system such as 4th generation mobile communication system (4G), 5th generation mobile communication system (5G), Long Term Evolution (LTE), or dedicated short range communications (DSRC), with a server or the like existing on an external network (for example, the Internet, a cloud network, or a network peculiar to a business operator) via a base station or an access point.

For example, the communication unit 22 uses peer-to-peer (P2P) technology to communicate with a terminal (for example, a terminal of a pedestrian or a store, or a machine-type communication (MTC) terminal) that exists near the own vehicle. For example, the communication unit 22 performs V2X communication. The V2X communication is, for example, vehicle-to-vehicle communication with other vehicles, vehicle-to-infrastructure communication with a roadside device or the like, communication with a home (vehicle-to-home), and vehicle-to-pedestrian communication with a terminal or the like possessed by a pedestrian.

For example, the communication unit 22 receives electromagnetic waves transmitted by the Vehicle Information and Communication System (VICS, a registered trademark) using a radio wave beacon, an optical beacon, FM multiplex broadcasting, and the like.

The map information storage unit 23 stores a map acquired from the outside and a map created by the vehicle 1. For example, the map information storage unit 23 stores a three-dimensional high-precision map, a global map that is less accurate than the high-precision map and covers a wide area, and the like.

High-precision maps include, for example, dynamic maps, point cloud maps, vector maps (also referred to as Advanced Driver Assistance System (ADAS) maps), and the like. The dynamic map is, for example, a map including four layers of dynamic information, quasi-dynamic information, quasi-static information, and static information, and is provided from an external server or the like. The point cloud map is a map formed by a point cloud (point cloud data). The vector map is a map in which information such as lanes and signal positions is associated with the point cloud map. The point cloud map and the vector map may be provided from, for example, an external server or the like or may be created in the vehicle 1 and stored in the map information storage unit 23 as a map for matching with a local map as described later on the basis of a sensing result by a radar 52, a LiDAR 53, or the like. Furthermore, in a case where a high-precision map is provided from an external server or the like, in order to reduce the communication capacity, for example, map data of several hundred meters square, relating to a planned route on which the vehicle 1 will travel from now on is acquired from the server or the like.

The GNSS reception unit 24 receives a GNSS signal from a GNSS satellite and supplies the signal to the driving support-automated driving control unit 29.

The external recognition sensor 25 includes various sensors used for recognizing an external situation of the vehicle 1, and supplies sensor data from each sensor to each part of the vehicle control system 11. The type and number of sensors included in the external recognition sensor 25 are arbitrary.

For example, the external recognition sensor 25 includes a camera 51, a radar 52, a Light Detection and Ranging, Laser Imaging Detection and Ranging (LiDAR) 53, and an ultrasonic sensor 54. The numbers of cameras 51, radars 52, LiDARs 53, and ultrasonic sensors 54 are arbitrary, and examples of a sensing area of each sensor will be described later.

Note that as the camera 51, for example, a camera of an arbitrary imaging method such as a Time Of Flight (ToF) camera, a stereo camera, a monocular camera, and an infrared camera is used as needed.

Furthermore, for example, the external recognition sensor 25 includes an environment sensor for detecting weather, climate, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting the position of a sound, a sound source, and the like around the vehicle 1.

The in-vehicle sensor 26 includes various sensors for detecting information in the vehicle, and supplies sensor data from each sensor to each part of the vehicle control system 11. The types and number of sensors included in the in-vehicle sensor 26 are arbitrary.

For example, the in-vehicle sensor 26 includes a camera, a radar, a seating sensor, a steering wheel sensor, a microphone, a biosensor, and the like. As the camera, for example, a camera of any imaging method such as a ToF camera, a stereo camera, a monocular camera, and an infrared camera can be used. The biosensor is provided on, for example, a seat, a steering wheel, or the like, and detects various biometric information of an occupant such as a driver.

The vehicle sensor 27 includes various sensors for detecting the state of the vehicle 1, and supplies sensor data from each sensor to each part of the vehicle control system 11. The type and number of sensors included in the vehicle sensor 27 are arbitrary.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects the steering angle of the steering wheel, a yaw rate sensor, an accelerator sensor that detects the operation amount of the accelerator pedal, and a brake sensor that detects the operation amount of the brake pedal. For example, the vehicle sensor 27 includes a rotation sensor that detects the rotation speed of an engine or a motor, an air pressure sensor that detects tire pressure, a slip ratio sensor that detects a tire slip ratio, and a wheel speed sensor that detects wheel rotation speed. For example, the vehicle sensor 27 includes a battery sensor that detects the remaining amount and temperature of a battery, and an impact sensor that detects an external impact.

The recording unit 28 includes, for example, a read only memory (ROM), a random access memory (RAM), a magnetic storage device such as a hard disc drive (HDD), a semiconductor storage device, an optical storage device, a magneto-optical storage device, and the like. The recording unit 28 records various programs, data, and the like, used by each unit of the vehicle control system 11. For example, the recording unit 28 records a rosbag file including messages sent and received by a robot operating system (ROS) in which an application program related to automated driving operates. For example, the recording unit 28 includes an Event Data Recorder (EDR) and a Data Storage System for Automated Driving (DSSAD), and records information on the vehicle 1 before and after an event such as an accident.

The driving support-automated driving control unit 29 controls the driving support and automated driving of the vehicle 1. For example, the driving support-automated driving control unit 29 includes an analysis unit 61, an action planning unit 62, and an operation control unit 63.

The analysis unit 61 analyzes the vehicle 1 and a situation of the surroundings. The analysis unit 61 includes a self-position estimation unit 71, a sensor fusion unit 72, and a recognition unit 73.

The self-position estimation unit 71 estimates the self-position of the vehicle 1 on the basis of sensor data from the external recognition sensor 25 and the high-precision map stored in the map information storage unit 23. For example, the self-position estimation unit 71 estimates the self-position of the vehicle 1 by generating a local map on the basis of the sensor data from the external recognition sensor 25 and matching the local map with the high-precision map. The position of the vehicle 1 is based on, for example, the center of a rear wheel-to-axle.

The local map is, for example, a three-dimensional high-precision map created by using a technique such as simultaneous localization and mapping (SLAM), an occupancy grid map, or the like. The three-dimensional high-precision map is, for example, the above-described point cloud map or the like. The occupancy grid map is a map that divides the three-dimensional or two-dimensional space around the vehicle 1 into grids (lattice) of a predetermined size and illustrates an occupied state of an object in grid units. The occupied state of an object is indicated by, for example, presence or absence or existence probability of the object. The local map is also used, for example, in the detection processing and the recognition processing of the external situation of the vehicle 1 by the recognition unit 73.

Note that the self-position estimation unit 71 may estimate the self-position of the vehicle 1 on the basis of the GNSS signal and sensor data from the vehicle sensor 27.

The sensor fusion unit 72 performs sensor fusion processing to obtain new information by combining a plurality of different types of sensor data (for example, image data supplied from the camera 51 and sensor data supplied from the radar 52). The method for combining different types of sensor data includes integration, fusion, association, and the like.

The recognition unit 73 performs detection processing and recognition processing of the external situation of the vehicle 1.

For example, the recognition unit 73 performs detection processing and recognition processing of the external situation of the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The object detection processing is, for example, processing of detecting presence or absence, size, shape, position, movement, and the like of an object. The recognition processing of an object is, for example, processing of recognizing an attribute such as an object type or identifying a specific object. However, the detection processing and the recognition processing are not always clearly separated and may overlap.

For example, the recognition unit 73 detects an object around the vehicle 1 by performing clustering that classifies a point cloud based on sensor data of a LiDAR, a radar, or the like into each mass of the point cloud. Thus, the presence or absence, size, shape, and position of an object around the vehicle 1 are detected.

For example, the recognition unit 73 detects movement of an object around the vehicle 1 by performing tracking to follow movement of the mass of the point cloud classified by clustering. Thus, the velocity and the traveling direction (movement vector) of the object around the vehicle 1 are detected.

For example, the recognition unit 73 recognizes the type of an object around the vehicle 1 by performing object recognition processing such as semantic segmentation on the image data supplied from the camera 51.

Note that as the object to be a detection or recognition target, for example, a vehicle, a person, a bicycle, an obstacle, a structure, a road, a traffic light, a traffic sign, a road sign, or the like is assumed.

For example, the recognition unit 73 performs recognition processing of traffic rules around the vehicle 1 on the basis of the map stored in the map information storage unit 23, an estimation result of the self-position, and a recognition result of an object around the vehicle 1. By this processing, for example, a position and state of a signal, contents of traffic signs and road markings, contents of traffic regulations, lanes in which the vehicle can travel, and the like are recognized.

For example, the recognition unit 73 performs recognition processing of a surrounding environment of the vehicle 1. The surrounding environment to be a recognition target includes, for example, weather, temperature, humidity, brightness, and road surface conditions, and the like.

The action planning unit 62 creates an action plan for the vehicle 1. For example, the action planning unit 62 creates an action plan by performing route planning and route following processing.

Note that the route planning (Global path planning) is a process of planning a rough route from a start to a goal. This route planning is called track planning, and also includes processing of track generation (Local path planning) that allows safe and smooth traveling near the vehicle 1 in consideration of motion characteristics of the vehicle 1 in the route planned by the route planning.

The route following is a process of planning an operation for safely and accurately traveling on the route planned by the route planning within a planned time. For example, the target speed and target angular velocity of the vehicle 1 are calculated.

The operation control unit 63 controls operation of the vehicle 1 in order to achieve the action plan created by the action planning unit 62.

For example, the operation control unit 63 controls a steering control unit 81, a brake control unit 82, and a drive control unit 83 to perform acceleration and deceleration control and direction control so that the vehicle 1 travels on the track calculated by the track planning. For example, the operation control unit 63 performs coordinated control for the purpose of achieving ADAS functions such as collision avoidance or impact mitigation, follow-up traveling, vehicle speed maintained traveling, collision warning of own vehicle, and lane deviation warning of the own vehicle. For example, the operation control unit 63 performs coordinated control for the purpose of automated driving or the like to autonomously travel without an operation by the driver.

The DMS 30 performs driver authentication processing, driver status recognition processing, and the like on the basis of sensor data from the in-vehicle sensor 26 and input data input to the HMI 31. As the state of the driver to be a recognition target, for example, physical condition, alertness, concentration, fatigue, line-of-sight direction, degree of drunkenness, driving operation, posture, and the like are assumed.

Note that the DMS 30 may perform authentication processing for an occupant other than the driver and recognition processing for the state of the occupant. Furthermore, for example, the DMS 30 may perform recognition processing of a condition inside the vehicle on the basis of sensor data from the in-vehicle sensor 26. As the condition inside the vehicle to be a recognition target, for example, temperature, humidity, brightness, odor, and the like are assumed.

The HMI 31 is used for inputting various data, instruction, and the like, generates an input signal on the basis of the input data, instruction, and the like, and supplies the input signal to each part of the vehicle control system 11. For example, the HMI 31 includes an operation device such as a touch panel, a button, a microphone, a switch, and a lever, and an operation device that allows input by a method other than manual operation by a voice, a gesture, or the like. Note that the HMI 31 may be, for example, a remote control device using infrared rays or other radio waves, or an externally connected device such as a mobile device or a wearable device corresponding to operation of the vehicle control system 11.

Furthermore, the HMI 31 performs output control that controls generation and output of visual information, auditory information, and tactile information for an occupant or the outside of the vehicle, as well as output content, output timing, output method, and the like. The visual information is, for example, information indicated by an image or light of an operation screen, a status display of the vehicle 1, a warning display, a monitor image illustrating a surrounding situation of the vehicle 1, or the like. The auditory information is, for example, information indicated by voice such as guidance, a warning sound, and a warning message. The tactile information is information given to tactile sensation of the occupant by, for example, force, vibration, movement, or the like.

As a device that outputs visual information, for example, a display device, a projector, a navigation device, an instrument panel, a camera monitoring system (CMS), an electronic mirror, a lamp, or the like is assumed. The display device may be a device that displays visual information in a visual field of an occupant, such as a head-up display, a transmissive display, and a wearable device having an augmented reality (AR) function, for example, in addition to a device having a normal display.

As a device that outputs auditory information, for example, an audio speaker, headphones, earphones, or the like is assumed.

As a device that outputs tactile information, for example, a haptics element using haptics technology or the like is assumed. The haptic element is provided on, for example, a steering wheel, a seat, or the like.

The vehicle control unit 32 controls each part of the vehicle 1. The vehicle control unit 32 includes a steering control unit 81, a brake control unit 82, a drive control unit 83, a body system control unit 84, a light control unit 85, and a horn control unit 86.

The steering control unit 81 performs detection and control of a state of a steering system of the vehicle 1, and the like. The steering system includes, for example, a steering mechanism including a steering wheel and the like, electric power steering, and the like. The steering control unit 81 includes, for example, a control unit such as an ECU that controls the steering system, an actuator that drives the steering system, and the like.

The brake control unit 82 performs detection and control of a state of a brake system of the vehicle 1, and the like. The brake system includes, for example, a brake mechanism including a brake pedal and the like, an antilock brake system (ABS), and the like. The brake control unit 82 includes, for example, a control unit such as an ECU that controls the brake system, an actuator that drives the brake system, and the like.

The drive control unit 83 performs detection and control of a state of a drive system of the vehicle 1, and the like. The drive system includes, for example, an accelerator pedal, a drive force generator for generating a drive force, such as an internal combustion engine, a drive motor, or the like, a drive force transmission mechanism for transmitting the drive force to the wheels, and the like. The drive control unit 83 includes, for example, a control unit such as an ECU that controls the drive system, an actuator that drives the drive system, and the like.

The body system control unit 84 performs detection and control of a state of a body system of the vehicle 1, and the like. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system, an actuator that drives the body system, and the like.

The light control unit 85 performs detection and control of states of various lights of the vehicle 1, and the like. As the lights to be controlled, for example, headlights, backlights, fog lights, turn signals, brake lights, projections, bumper displays, and the like are assumed. The light control unit 85 includes a control unit such as an ECU that controls the lights, an actuator that drives the lights, and the like.

The horn control unit 86 performs detection and control of a state of a car horn of the vehicle 1, and the like. The horn control unit 86 includes, for example, a control unit such as an ECU that controls the car horn, an actuator that drives the car horn, and the like.

Figure 2:
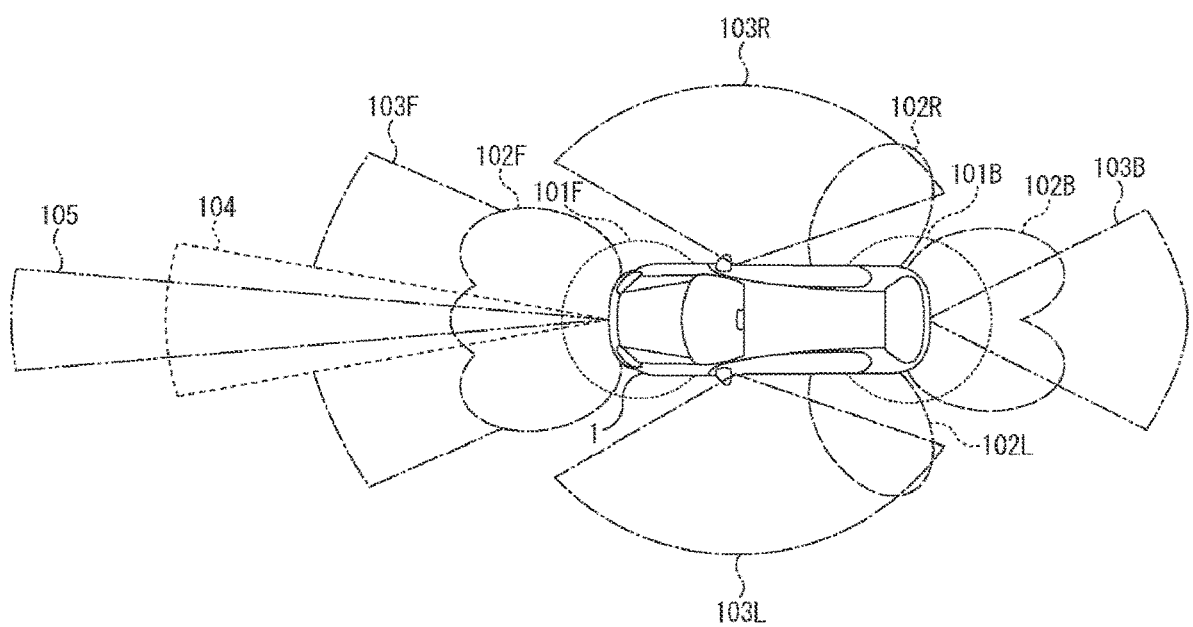
FIG. 2 is a diagram illustrating examples of sensing areas.

FIG. 2 is a diagram illustrating examples of sensing areas by the camera 51, the radar 52, the LiDAR 53, and the ultrasonic sensor 54 of the external recognition sensor 25 of FIG. 1.

A sensing area 101F and a sensing area 101B illustrate examples of sensing areas of the ultrasonic sensor 54. The sensing area 101F covers a periphery of a front end of the vehicle 1. The sensing area 101B covers a periphery of a rear end of the vehicle 1.

Sensing results in the sensing area 101F and the sensing area 101B are used, for example, for parking support of the vehicle 1, and the like.

A sensing area 102F to a sensing area 102B illustrate examples of sensing areas of the radar 52 for short range or medium range. The sensing area 102F covers a position farther than the sensing area 101F in front of the vehicle 1. The sensing area 102B covers a position farther than the sensing area 101B in rear of the vehicle 1. A sensing area 102L covers a rear periphery of a left side surface of the vehicle 1. A sensing area 102R covers a rear periphery of a right side surface of the vehicle 1.

A sensing result in the sensing area 102F is used, for example, for detecting a vehicle, a pedestrian, or the like existing in front of the vehicle 1. A sensing result in the sensing area 102B is used, for example, for a collision prevention function behind the vehicle 1, or the like. Sensing results in the sensing area 102L and the sensing area 102R are used, for example, for detecting an object in blind spots on the sides of the vehicle 1, and the like.

A sensing area 103F to a sensing area 103B illustrate an example of sensing areas by the camera 51. The sensing area 103F covers a position farther than the sensing area 102F in front of the vehicle 1. The sensing area 103B covers a position farther than the sensing area 102B in rear of the vehicle 1. The sensing area 103L covers a periphery of the left side surface of the vehicle 1. The sensing area 103R covers a periphery of the right side surface of the vehicle 1.

A sensing result in the sensing area 103F is used, for example, for recognition of traffic lights and traffic signs, lane departure prevention support systems, and the like. A sensing result in the sensing area 103B is used, for example, in parking support, surround view systems, and the like. Sensing results in the sensing area 103L and the sensing area 103R are used, for example, in a surround view system or the like.

A sensing area 104 illustrates an example of a sensing area of the LiDAR 53. The sensing area 104 covers a position farther than the sensing area 103F in front of the vehicle 1.

On the other hand, the sensing area 104 has a narrower range in a left-right direction than the sensing area 103F.

A sensing result in the sensing area 104 is used, for example, for emergency braking, collision avoidance, pedestrian detection, and the like.

A sensing area 105 illustrates an example of a sensing area of the radar 52 for long range. The sensing area 105 covers a position farther than the sensing area 104 in front of the vehicle 1. On the other hand, the sensing area 105 has a narrower range in the left-right direction than the sensing area 104.

The sensing result in the sensing area 105 is used for, for example, adaptive cruise control (ACC) and the like.

Note that the respective sensing areas of the sensors may have various configurations other than those illustrated in FIG. 2. Specifically, the ultrasonic sensor 54 may also sense the side of the vehicle 1, or the LiDAR 53 may sense the rear of the vehicle 1.

Configuration Example of Information Processing Device

Figure 3:
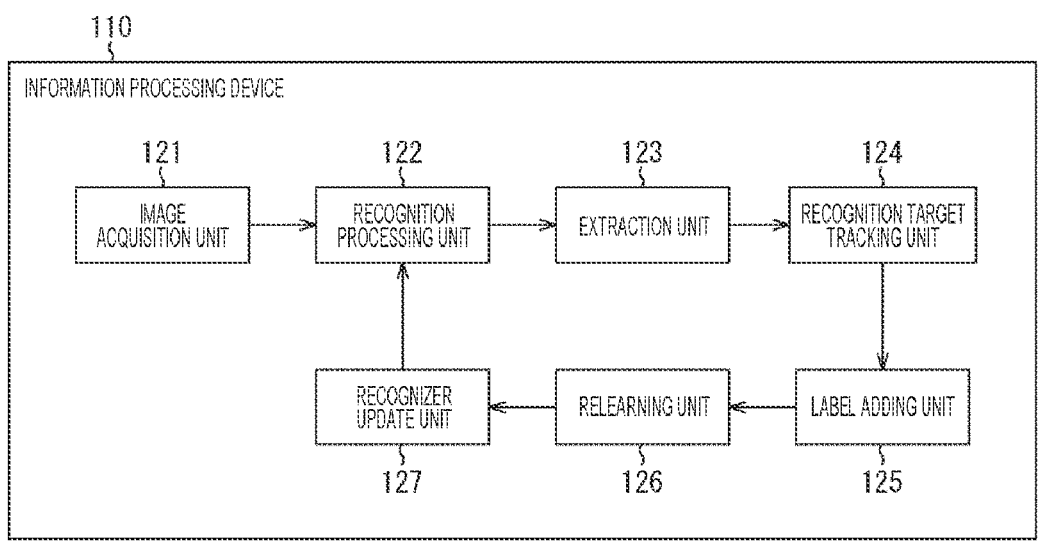
FIG. 3 is a diagram illustrating a configuration example of one embodiment of an information processing device to which the present technology is applied.

FIG. 3 is a diagram illustrating a configuration of one embodiment of an information processing device to which the present technology is applied. The information processing device 110 is mounted on the vehicle 1, for example, and can be used as a device that analyzes a captured image and recognizes a predetermined object such as a person or a car. The information processing device 110 according to the present embodiment has a function of performing recognition using a recognizer to which a learning model of machine learning or the like is applied when executing recognition processing, and updating the recognizer so as to reduce erroneous detection.

The information processing device 110 illustrated in FIG. 3 includes an image acquisition unit 121, a recognition processing unit 122, an extraction unit 123, a recognition target tracking unit 124, a label adding unit 125, a relearning unit 126, and a recognizer update unit 127.

The image acquisition unit 121 acquires image data of an image captured by an imaging unit (not illustrated) that captures an image. The image acquisition unit 121 acquires, for example, an image captured by the camera 51 (FIG. 1). The recognition processing unit 122 analyzes the image acquired by the image acquisition unit 121, and recognizes a predetermined object such as a person or a car using a recognizer (learning model). The recognition processing unit 122 executes recognition processing using a recognizer to which a learning model for performing recognition processing on input data is applied.

In a case where the information processing device 110 is mounted on a vehicle, for example, a recognition result recognized by the information processing device 110 can be used for semi-automated driving for assisting steering wheel operation or brake operation for avoiding a recognized object.

A recognition result from the recognition processing unit 122 of the information processing device 110 is supplied to the extraction unit 123. The extraction unit 123 extracts a recognition result satisfying a condition for updating a recognizer to be described later. An extraction result from the extraction unit 123 is supplied to the recognition target tracking unit 124. The recognition target tracking unit 124 tracks the extracted recognition result over a plurality of frames. The plurality of frames is frames captured in a reverse direction (past direction) in time series, and the recognition target tracking unit 124 executes processing of tracking the recognition target in the reverse direction in time series.

A tracking result by the recognition target tracking unit 124 is supplied to the label adding unit 125. The label adding unit 125 adds a label to the tracked recognition target. The recognition target to which the label is added is supplied to the relearning unit 126. The relearning unit 126 performs relearning on the recognizer by using the recognition target to which the label is added. The new recognizer generated by the relearning is supplied to the recognizer update unit 127. The recognizer update unit 127 updates the recognizer of the recognition processing unit 122 to the recognizer on which the relearning has been performed by the relearning unit 126.

The relearning unit 126 has a function of executing learning of parameters (parameters that may be referred to as model parameters) included in the recognizer of the recognition processing unit 122. For the learning, for example, various machine learning techniques using neural networks such as Recurrent Neural Network (RNN) and Convolutional Neural Network (CNN) can be used.

The learning processing will be described with reference to FIG. 4. A labeled image in which labels for classifying a plurality of subjects included in the image are created in advance is input to the recognizer. For example, the recognizer performs image recognition on the labeled image, recognizes a plurality of subjects included in the labeled image, and outputs a recognition result obtained by classifying each subject.

The recognition result output from the recognizer is compared with a correct answer label for the labeled image, and feedback to the recognizer is performed so that the recognition result approaches the correct answer label. In this manner, learning is performed so that (the learning model of) the recognizer performs more accurate recognition using the correct answer label. The recognition processing unit 122 can be configured to perform recognition processing using the learned learning model.

Note that the learning processing described here is an example, and the present technology can also be applied to a case where learning is performed by another learning processing or a recognizer obtained by another learning processing is used. As the learning processing, learning processing that does not use the labeled image or the correct answer label can be applied to the present technology.

Figure 4:
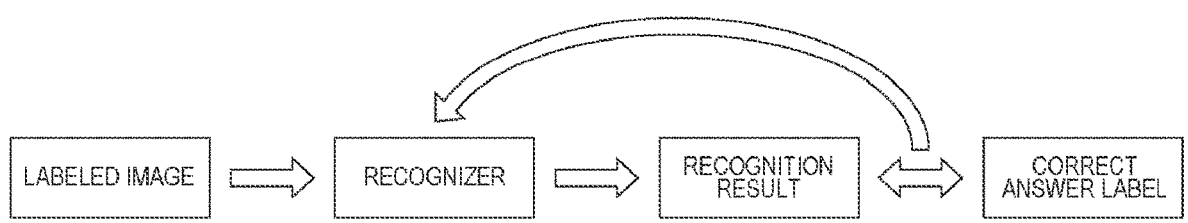
FIG. 4 is a diagram for describing how to perform learning.

The relearning unit 126 performs relearning of the recognizer (learning model) by the learning processing as illustrated in FIG. 4. For example, the recognition result from the recognition processing unit 122 is used as the labeled image, and an image to which a label is added by the label adding unit 125 is used as the correct answer label to perform relearning of the recognizer.

In the relearning, a frame captured at a predetermined time is used as a reference, and several frames captured at a time point before the frame used as the reference are used to perform the relearning. The relearning is performed to generate a recognizer with less erroneous detection, and as the erroneous detection, there are a case where a recognition target, for example, an object such as a person or a car is not detected even though it is shown in an image, a case where the object is detected but is detected as an erroneous object, for example, a case where the object is detected as a car although it is a person, and the like.

Such erroneous detection and relearning will be described below with reference to a captured image example. Here, a case where an image captured by the in-vehicle camera is processed will be described as an example.

FIGS. 5 to 9 are diagrams illustrating examples of images (frames) captured at time t1, time t2, time t3, time t4, and time t5, respectively. FIGS. 5 to 9 also illustrate detection frames displayed for objects recognized (detected) by processing each of frames F1 to F5 by the recognition processing unit 122. The description will be continued assuming that the time elapses in the order of the time t1, the time t2, the time t3, the time t4, and the time t5, in other words, the time t1 is the oldest (past) and the time t5 is the newest (current time).

Figure 5:
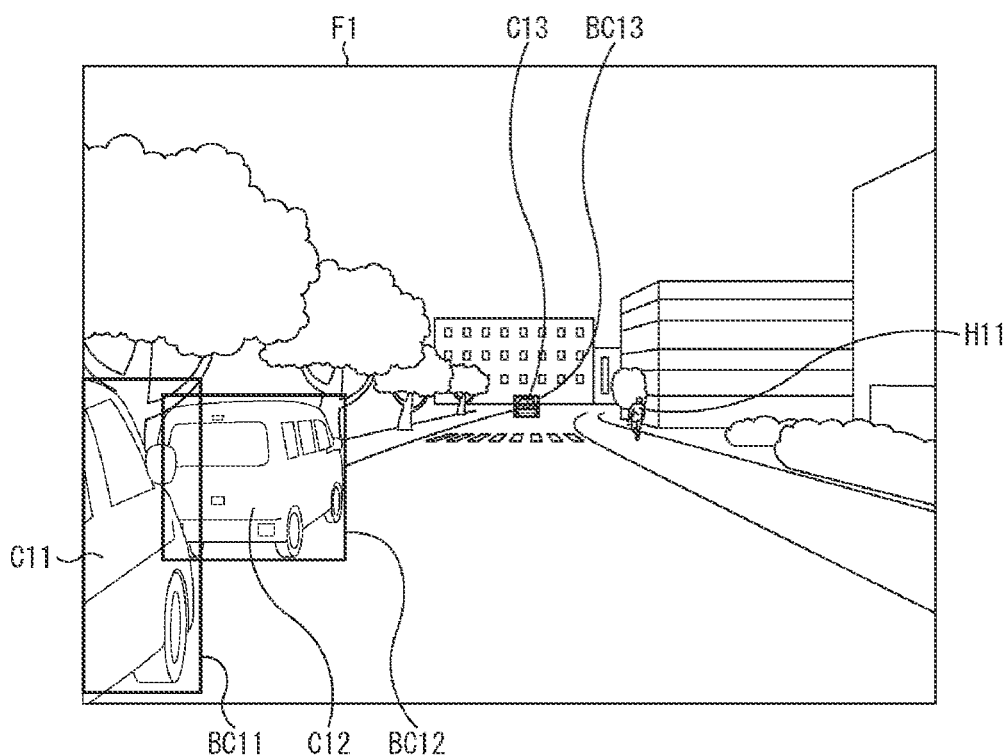
FIG. 5 is a diagram illustrating an example of a recognition result.

A car C11 and a car C12 are captured on the left side of the frame F1 illustrated in FIG. 5, and a car C13 is captured on the front side. Furthermore, a person H11 is captured on the right side. The frame F1 is processed by the recognition processing unit 122 (FIG. 3), and thereby the car C11, the car C12, and the car C13 are detected. A detected object is surrounded by a quadrangular detection frame.

In FIG. 5, the car C11 is surrounded by a detection frame BC11, the car C12 is surrounded by a detection frame BC12, and the car C13 is surrounded by a detection frame BC13. In the example illustrated in FIG. 5, the person H11 is captured but is not detected, and thus the detection frame is not displayed.

Semantic segmentation, instance segmentation, panoptic segmentation, and the like can be applied as a method of detecting a predetermined object such as a car or a person.

The semantic segmentation is a method of classifying all pixels on an image into classes and labeling each pixel. The instance segmentation is a method of dividing a region for each object and recognizing the type of the object. The panoptic segmentation is a method in which the semantic segmentation and the instance segmentation are combined, and is a method in which an object type can be recognized and labeling can be performed on all pixels.

Here, the description will be continued on the assumption that the panoptic segmentation is applied, but even the above-described methods other than the panoptic segmentation or any recognition method not illustrated here can be applied to the present technology.

Note that, in a case where recognition is performed by the panoptic segmentation, when the result is displayed as an image as illustrated in FIG. 5, pixels with the same label can be displayed in the same color. For example, different objects can be displayed in different colors, such as pixels labeled as the car C11 represented in red and pixels labeled as the car C12 represented in blue. Although colors are not illustrated in FIGS. 5 to 9, different objects are detected as different objects and displayed in respective different colors.

In the frame F1 illustrated in FIG. 5, there is an erroneous detection that the person H11 is captured but the person H11 is not detected.

Figure 6:
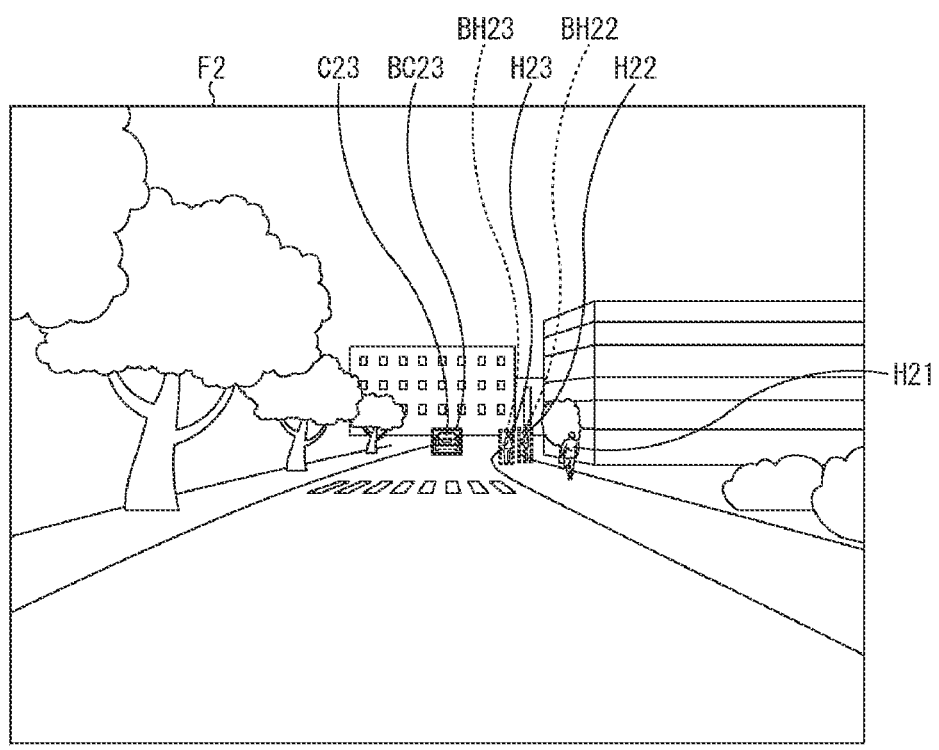
FIG. 6 is a diagram illustrating an example of a recognition result.

FIG. 6 is a diagram illustrating an example of the frame F2 captured at time t2 that is a time after time t1 (a time when a predetermined time has elapsed). It is a state where the vehicle has moved forward, and the car C11 and the car C12 captured in the frame F1 (FIG. 5) are out of the imaging range, and are not captured in the frame F2. The car C23 corresponds to the car C13 in the frame F1, is also detected in the frame 2, and is surrounded by the detection frame BC23.

The frame F2 is in a state where a person H21 corresponding to the person H11 (FIG. 5) is also captured, but is not detected. In the frame F2, a person H22 and a person H23 are newly detected, and are surrounded by a detection frame BH22 and a detection frame BH23, respectively.

The detection frame can be displayed in different colors and line types depending on the label. FIG. 6 illustrates an example in which a solid-line detection frame is displayed on a recognition result labeled as a car, and a dotted-line detection frame is displayed on a recognition result labeled as a person.

Figure 7:
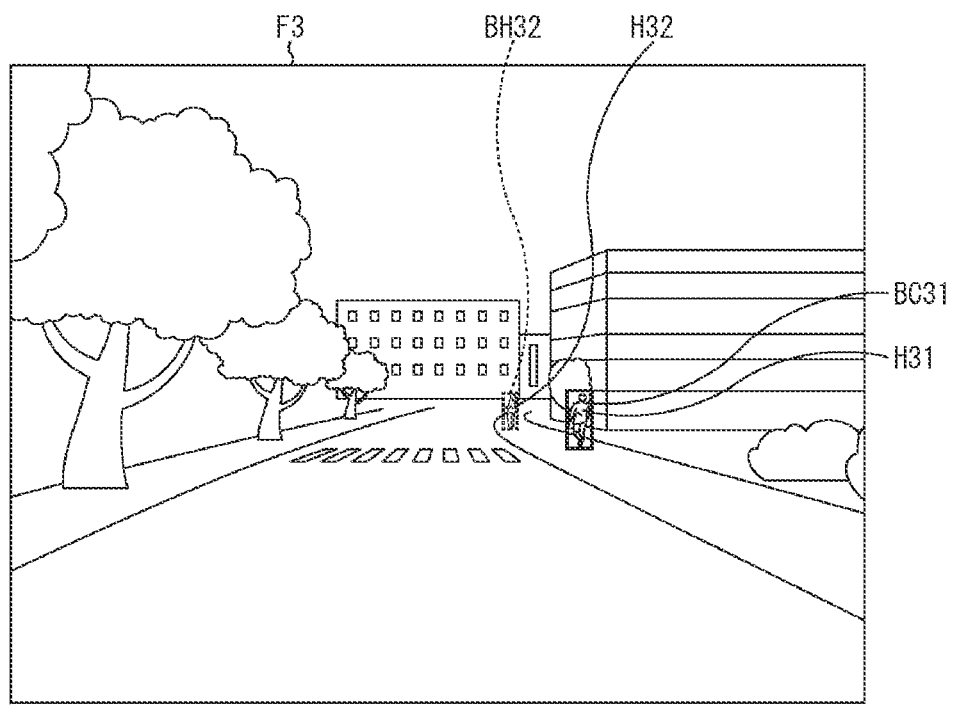
FIG. 7 is a diagram illustrating an example of a recognition result.

FIG. 7 is a diagram illustrating an example of the frame F3 captured at time t3 that is a time after time t2. In the frame F3, a person H11 (FIG. 5), a person H31 corresponding to the person H21 (FIG. 6), and a person H32 corresponding to the person H22 (FIG. 6) are captured. Each of the person H31 and the person H32 is detected. The person H31 is erroneously detected as a car, and thus the label of the car is added, and a detection frame BC31 displayed when being a car is displayed so as to surround the person H31. The person H32 is correctly detected as a person, and thus a detection frame BH32 displayed when being a person is displayed so as to surround the person H32.

Figure 8:
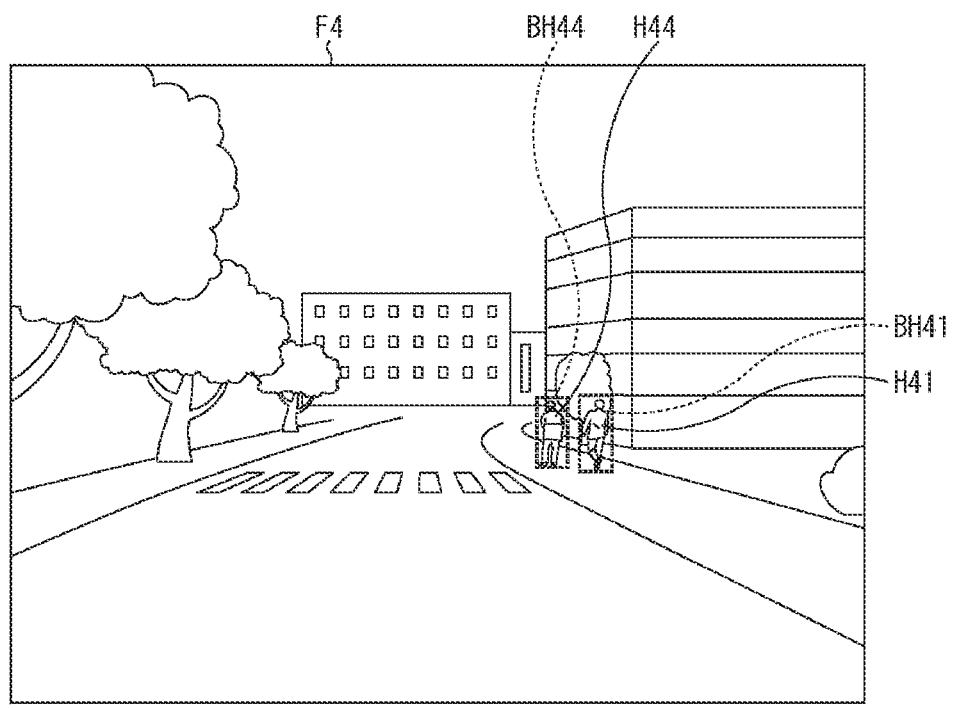
FIG. 8 is a diagram illustrating an example of a recognition result.

FIG. 8 is a diagram illustrating an example of the frame F4 captured at time t4 that is a time after time t3. In the frame F4, a person H41 corresponding to the person H11 (FIG. 5), the person H21 (FIG. 6), and the person H31 (FIG. 7) and a person H44 are captured. Each of the person H41 and the person H44 is correctly detected as a person, and thus a detection frame BH41 and a detection frame BH44 displayed when being a person are respectively displayed.

Figure 9:
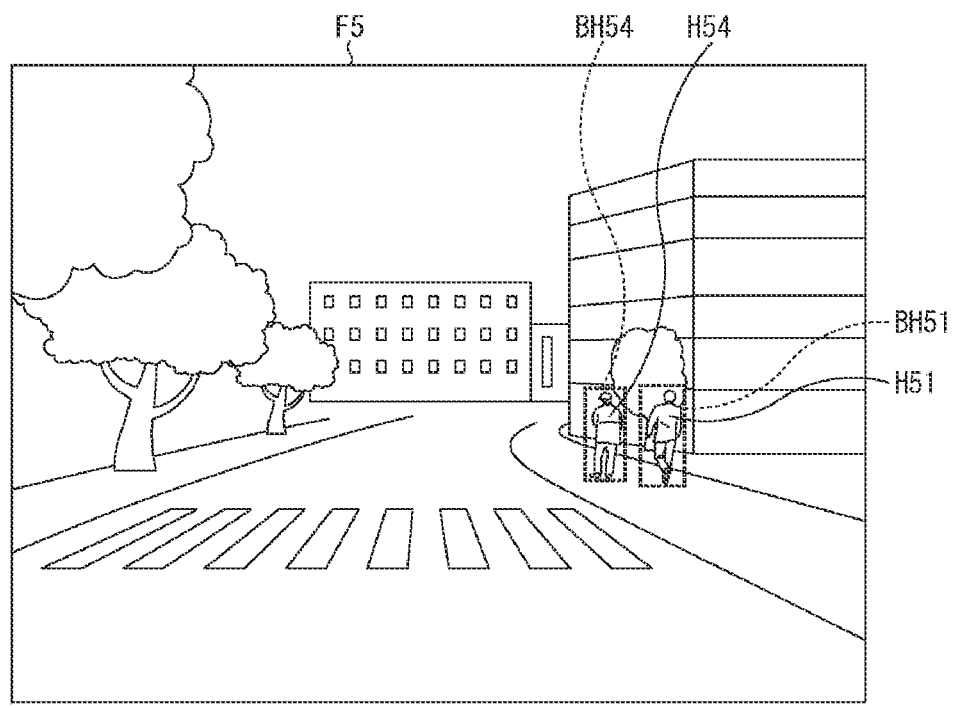
FIG. 9 is a diagram illustrating an example of a recognition result.

FIG. 9 is a diagram illustrating an example of the frame F5 captured at time t5 that is a time after time t4. In the frame F5, the person H11 (FIG. 5), the person H21 (FIG. 6), the person H31 (FIG. 7), a person H51 corresponding to the person H41 (FIG. 8), and a person H54 corresponding to the person H44 (FIG. 9) are captured. Each of the person H51 and the person H54 is correctly detected as a person, and thus a detection frame BH51 and a detection frame BH54 displayed when being a person are respectively displayed.

Figure 10:
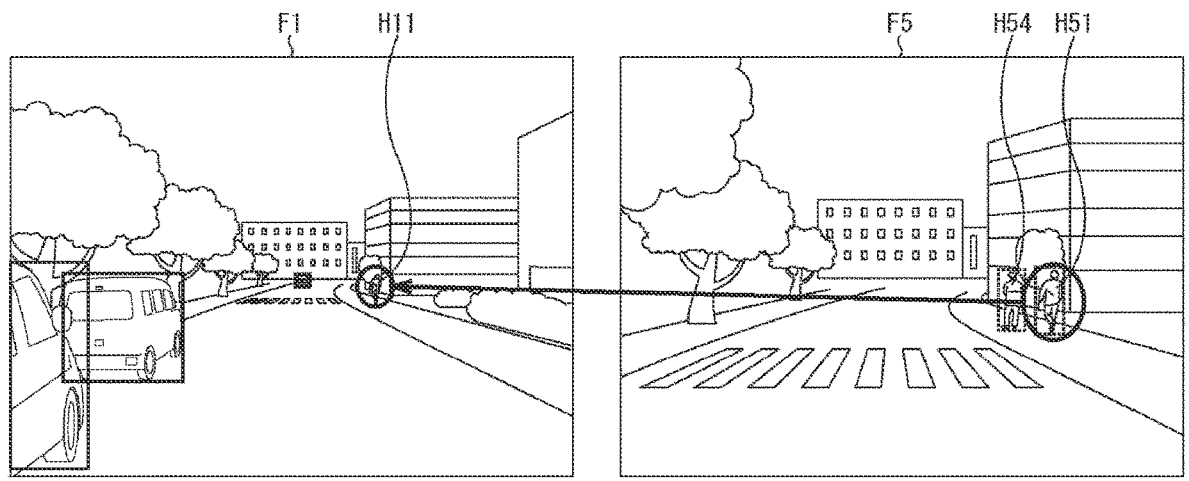
FIG. 10 is a diagram for describing detection by tracking.

A case where the frames F1 to F5 are captured in this manner and the recognition processing result is output will be considered. FIG. 10 is a diagram illustrating the frame F1 and the frame F5 arranged side by side. In FIG. 10, attention is paid to the person H11 and a person H51. The frame F1 is in a state where the person H11 is captured but not detected. The frame F5 is in a state where the person H51 is captured and detected.

The person H11 captured in the frame F1 is not detected at the time of the frame F1. In other words, in the frame F1, there is an erroneous detection that the person H11 to be detected is not detected.

The person H11 is detected as the person H51 in the frame F5. The person H11 is captured as the person H21 (frame F2), the person H31 (frame F3), the person H41 (frame F4), and the person H51 (frame H5). That is, the person H11 is continuously captured from the frames F1 to F5. In such a case, in a case where the person H51 is tracked in the order of the frame F5, the frame F4, the frame F3, the frame F2, and the frame F1, the person H51, the person H41, the person H31, the person H21, and the person H11 can be detected (tracked) in this order.

By performing tracking going back to the past, a person corresponding to the person H51 can be labeled in each frame. For example, in the frame F1, the person H11 can be labeled. By performing learning using the labeled frame F1, it is possible to generate a recognizer capable of detecting the person H11 from an image like the frame F1 and adding a label.

In the frame F3 (FIG. 7), while there is an erroneous detection that the person H31 is detected as a car, the person H51, the person H41, and the person H31 are tracked by tracking the frame F3 from the frames F5 and F4, and thus the person H31 is labeled as a person. By performing learning on the person H31 using the frame F3 labeled as a person, it is possible generate a recognizer capable of detecting the person H31 from an image like the frame F3 and adding a correct label as a person.

In the frame F5, the person H51 and the person H54 are captured. A person corresponding to the person H54 is not detected in the frames F3 to F1. If the person corresponding to the person H54 is captured also in the frames F3 to F1, the person corresponding to the person H54 can be detected and labeled in the frames F3 to F1 by tracking the person corresponding to the person H54 in the past direction. As a result of the tracking, in the frames F3 to F1, if the person corresponding to the person H54 is labeled, it is possible to generate a recognizer capable of detecting the person corresponding to the person H54 even in the images like the frames F3 to F1 by performing learning using the frames F3 to F1.

By following in the reverse direction in the time direction in this manner, it is possible to detect an object that has not been detected or detect an object for which erroneous recognition has been performed with correct recognition. By following in such reverse direction in the time direction, learning using a newly labeled image can be performed. As a result, a recognizer (learning model) with less erroneous detection can be generated.

<Processing of Information Processing Device>

Figure 11:
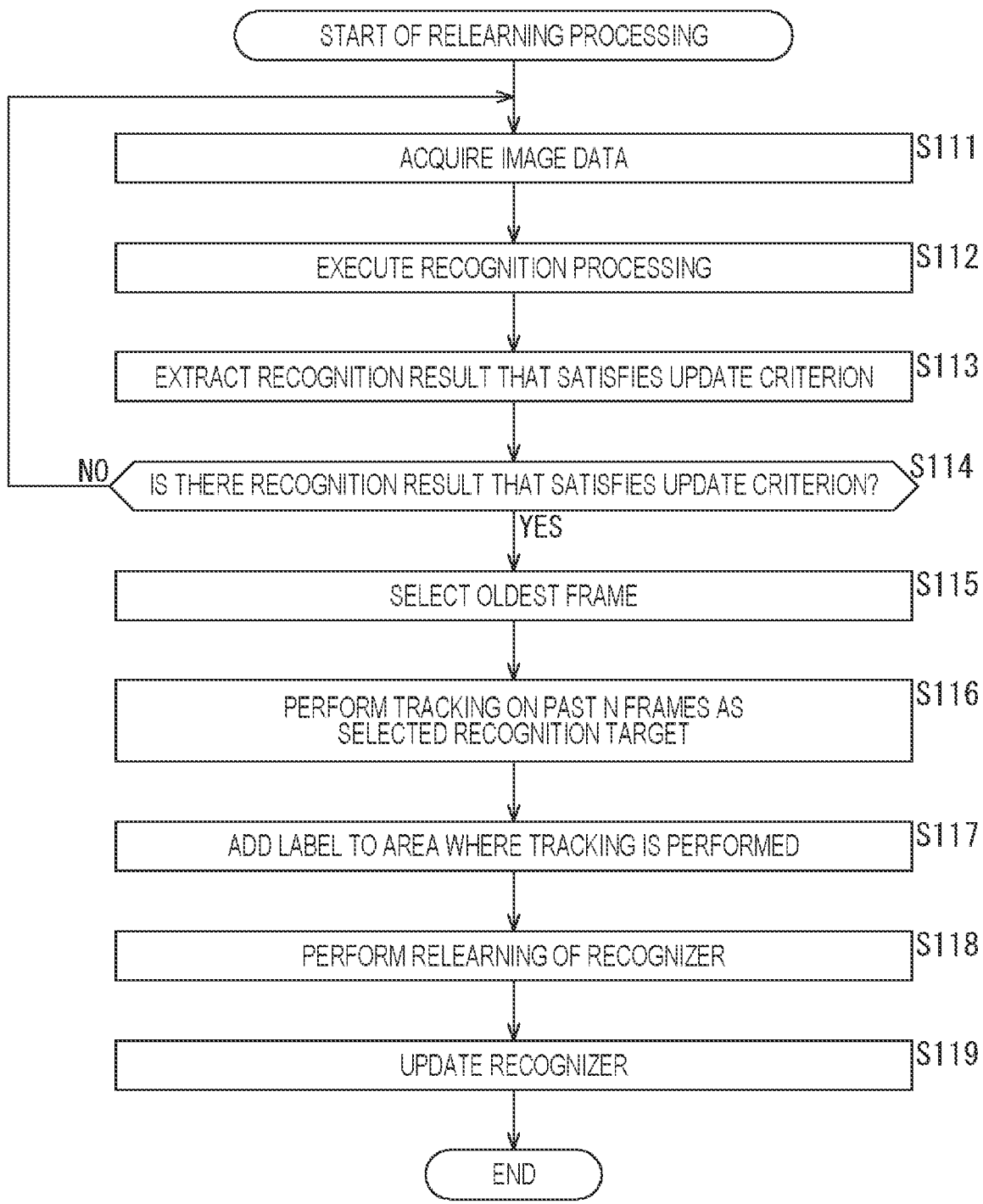
FIG. 11 is a flowchart for describing an operation of the information processing device.

The information processing device 110 executes processing related to such learning (relearning). The processing of the information processing device 110 (FIG. 3) will be described with reference to the flowchart illustrated in FIG. 11.

In step S111, the image acquisition unit 121 acquires image data (frame). In step S112, the recognition processing unit 122 analyzes an image based on the image data acquired by the image acquisition unit 121, thereby executing recognition processing using the recognizer to which the learning model for performing recognition processing is applied. The recognition processing performed by the recognition processing unit 122 is processing using a recognizer that recognizes a predetermined object such as a person or a car, and is, for example, processing of detecting the car C11 from the frame F1 and adding the label of the car as described with reference to FIG. 5.

In step S113, the extraction unit 123 extracts a recognition result that satisfies an update criterion. The update criterion is a criterion for determining whether or not data requires update of the recognizer. The update criterion is a criterion for determining to perform relearning in a case where there is a recognition result satisfying a criterion described below among recognition results.

Here, an object detected by the recognition processing of the recognition processing unit 122 is described as a recognition result, and a recognition result extracted by the extraction unit 123 is described as a recognition target. As described later, the recognition target is a recognition result as a target of tracking. The update criterion will be described with reference to FIGS. 12A and 12B.

Figure 12A:
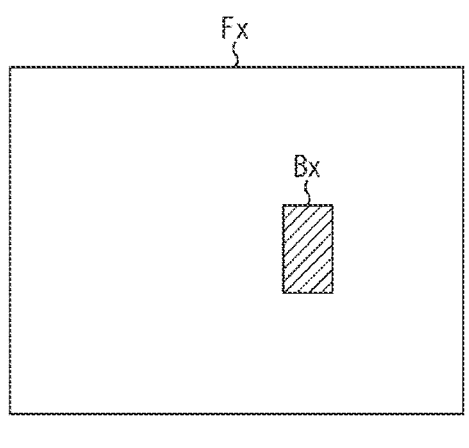
FIGS. 12A and 12B are diagrams for describing an update criterion.

As illustrated in FIG. 12A, a criterion such that, in a case where there is a recognition result in which the size Bx of the recognition result is x % or more of the area of an image Fx, the recognition result is extracted as a recognition target, is provided as a first update criterion. The size of the recognition result can be, for example, the area of a region surrounded by the detection frame BC11 of the car C11 in the frame F1 (FIG. 5). A height or a width may be used instead of the area, and the height or the width may be the height or the width of the detection frame BC11 of the car C11, and if the height or the width is equal to or larger than a predetermined size, it may be extracted as a recognition target. The area of the image Fx is, for example, the image size of the frame F1.

The first update criterion is a criterion for setting, in a case where there is an object detected with a certain size, the object as a tracking target, that is, a recognition target in this case. In general, the reliability of the detection result is higher and the possibility of erroneous detection is lower in a case where the size detected as the predetermined object is larger than in a case where the size is smaller. Therefore, the first update criterion is provided so that relearning is performed on the object detected in such a highly accurate state as the recognition target.

Note that the first update criterion may have a different value of x % depending on the recognition result. For example, in a case where the same value of x % is used for a case where the recognition result is a person and a case where the recognition result is a car, since the car is larger than the person, it is considered that the first update criterion is easily satisfied when where the recognition result is a car, but it is difficult to satisfy the first update criterion in a case where the recognition result is a person. Accordingly, the value of x % may be a variable value according to the label of the recognition result, and it may be determined whether or not the first update criterion is satisfied using different x for each recognition result.

Figure 12B:
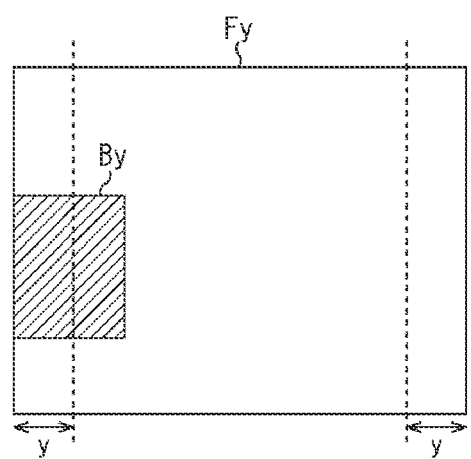

As illustrated in FIG. 12B, a criterion such that, in a case where there is a recognition result in which the distance from the side of the image Fy is y % or more, the recognition result is extracted as a recognition target, is provided as a second update criterion. The image Fy is one frame, and one side of the frame is, for example, a left side or a right side as illustrated in FIG. 12B. The distance from the side being y % or more is, for example, a ratio when the length of the frame in a horizontal direction (distance from the right side to the left side) is 100%.

For example, referring to the frame F1 (FIG. 5), the car C11 is captured in a visible state. The second update criterion is a criterion for not setting the object captured in such a visible state as the recognition target.

Note that, in FIG. 12B, the distance in the horizontal direction (distance from the left side and the right side) has been described as an example, but the distance may be a distance in a vertical direction (distance from the upper side and the lower side). A reference may be provided for both the horizontal direction and the vertical distance. As in the first update criterion, different y % may be used depending on the label.

The extraction unit 123 extracts a recognition result that satisfies the first update criterion or/and the second update criterion, and in a case where the recognition result is extracted, the recognition result is set as a recognition target as a target of tracking. In a case where the recognition target is set, several past frames are set as the frame as the tracking target with reference to the frame from which the recognition target is extracted.

Figure 13:
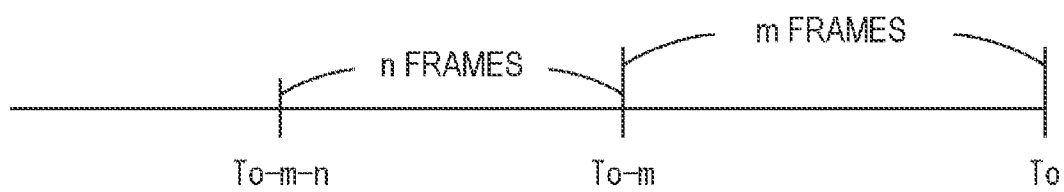
FIG. 13 is a diagram for describing a frame as a target of tracking.

Referring to FIG. 13, for example, in a case where a recognition result that satisfies the first update criterion or/and the second update criterion is extracted at time $T_0$, m frames captured during a period up to time $T_{0-m}$ before time $T_0$ are set as frames to be processed.

A third update criterion is a criterion such that, in a case where there is a recognition result detected continuously for m frames, the recognition result is extracted as a recognition target. Detection over m frames means that the object is detected with high accuracy. In a case where there is a recognition result detected with such high accuracy, the recognition result is extracted as a recognition target.

In order to determine whether or not the third update criterion is satisfied, the extraction unit 123 includes a storage unit (not illustrated) that stores a plurality of frames. In a case where the recognition result satisfying the third update criterion is extracted by the extraction unit 123, as illustrated in FIG. 13, n frames captured in the past before m frames are set as frames to be processed. Referring to FIG. 13, for example, in a case where a recognition result that satisfies the third update criterion is extracted at time $T_0$, it means that there have been recognition results continuously detected in m frames captured during a period up to time $T_{0-m}$ before time $T_0$. In such a case, n frames captured until time $T_{0-m-n}$ before time $T_{0-m}$ are set as frames to be processed.

Note that the m frames (the number of frames) in the third update criterion may be a fixed value or a variable value. In a case where the number of frames is a variable value, m may be set from, for example, a vehicle speed, a frame rate, a size of a recognition result, and the like. From these pieces of information, a frame in which the size of the recognition result becomes a height $h_{min}$ and a width $w_{min}$ may be estimated, and the number of frames until the size becomes the size may be set as m.

For example, when the vehicle speed is fast, the distance traveled within the unit time becomes long, and the number of captured objects to be replaced is also increased, so that the number of objects that continue to appear in a plurality of frames is reduced. In a case where the vehicle speed is fast, there is a possibility that it is difficult to extract an object to be a recognition target unless m of the m frame is reduced. On the other hand, in a case where the vehicle speed is slow, the number of objects that continue to appear in a plurality of frames increases, and if m of m frames is not increased, a large number of objects to be a recognition target are extracted, and as a result, relearning may be frequently executed.

In consideration of the above, m of the m frames may be set according to the vehicle speed, the frame rate, and the like as described above.

The size of the recognition result being the height $h_{min}$ and the width $w_{min}$ is the size when the predetermined recognition result is first captured or detected. How many frames before such a size is obtained, in other words, how many frames before a predetermined recognition result is recognized may be estimated, and the estimated number of frames may be set as m. This m can be estimated from information such as the vehicle speed, the frame rate, and the size of the recognition result.

m of the m frame may be set by referring to a correspondence table that gives m to the size of the recognition target, or may be calculated by a predetermined function.

A fourth update criterion is a criterion obtained by combining the first to third update criteria described above.

The fourth update criterion may be provided in which the first update criterion and the second update criterion are combined, and a recognition result in which a size of the recognition result is x % or more of a size of the frame and the distance from a side of the frame is y % or more is extracted as the recognition target. In this case, an object that is detected in a certain size and is highly likely to be captured in an invisible state is extracted.

The fourth update criterion may be provided in which the first update criterion and the third update criterion are combined, and when a recognition result in which a size of the recognition result is x % or more of a size of the frame is continuously detected for m frames, the recognition result is extracted as a recognition target. In this case, an object detected in a certain size and stably detected over several frames is extracted.

The fourth update criterion may be provided in which the second update criterion and the third update criterion are combined, and when a recognition result in which the distance from a side of a frame is y % or more is continuously detected for m frames, the recognition result is extracted as a recognition target. In this case, there is a high possibility that the image is captured in an invisible state, and an object stably detected over several frames is extracted.

The fourth update criterion may be provided in which the first to third update criteria are combined, and when a recognition result which is x % or more of a size of the frame and in which the distance from a side of the frame is y % or more is continuously detected for m frames, the recognition result is extracted as a recognition target. In this case, an object that is detected in a certain size, captured in an invisible state, and stably detected over several frames is extracted.

Such an update criterion is provided, and the extraction unit 123 (FIG. 3) extracts a recognition result that satisfies the update criterion. In step S113 (FIG. 11), when processing of extracting a recognition result that satisfies the update criterion is executed by the extraction unit 123, the determination in step S114 is performed using the processing result thereof. In step S114, it is determined whether or not there is a recognition result that satisfies the update criterion.

In a case where it is determined in step S114 that there is no recognition result satisfying the update criterion, the processing returns to step S111, and the subsequent processing is repeated.

On the other hand, in a case where it is determined in step S114 that there is a recognition result that satisfies the update criterion, the processing proceeds to step S115. In a case where there is a recognition result that satisfies the update criterion, the extraction unit 123 outputs information related to the recognition result, that is, information related to the recognition target, to the recognition target tracking unit 134. The information related to the recognition target is, for example, information such as coordinates, a size, and a label of the recognition target.

In step S115, the recognition target tracking unit 124 selects the oldest frame. The oldest frame differs from the oldest frame in which one of the first to fourth update criterion is used. In a case where the first or second update criterion or a criterion obtained by combining the first and second update criterion as the fourth update criterion is used, the frame to be processed for extraction, in other words, the frame from which the recognition target has been extracted is regarded as the oldest frame. For example, in a case where it is determined at time $T_0$ that there is a recognition result that satisfies the update criterion, a frame including the recognition result is set as the oldest frame.

In a case where the third update criterion is used, or in a case where a criterion obtained by combining the first update criterion and the third update criterion, a criterion obtained by combining the second update criterion and the third update criterion, or a criterion obtained by combining the first to third update criteria is used as the fourth update criterion, as described with reference to FIG. 13, recognition results continuously detected in m frames between time $T_0$, and time T0 are recognition targets, and thus the oldest frame is a frame captured at time $T_{0-m}$.

In step S116, tracking is performed on the past N frames as the selected recognition target. The selected recognition target is a recognition target when one of a plurality of recognition targets is selected and set as a target of tracking in a case where the plurality of recognition targets is extracted. The past N frames are (N−1) frames including the oldest frame selected in step S115 and captured in the past earlier than the oldest frame.

For example, it is assumed that the frame F5 illustrated in FIG. 9 is set as the oldest frame. In addition, it is assumed that the person H51 and the person H54 are extracted as recognition targets from the frame F5, and the person H51 is selected as a recognition target. In this case, in a case where N of the past N frames is 5, five frames of the frame F4, the frame F3, the frame F2, and the frame F1 including the frame F5 are the past N frames.

As the person H51 is sequentially tracked from the frame F5 to the frame F1, a person corresponding to the person H51 is detected in each of the frames F5 to F1, and is labeled as a person. That is, in the case of this example, the person H51 in the frame F5, the person H41 in the frame F4, the person H31 in the frame F3, the person H21 in the frame F2, and the person H11 in the frame F1 are tracked in this order, and a label as a person is added to each of them.

In step S116, the recognition target tracking unit 124 performs tracking in the reverse direction in time series, and a label is added to a result of the tracking by the label adding unit 125 in step S117. Such tracking and labeling are performed for each recognition target.

In step S118, the relearning unit 126 performs relearning of the learning model of the recognizer. The relearning unit 126 performs learning of a recognizer (learning model) by using a set of an image (frame) and a label as teacher data. In this learning method, as described with reference to FIG. 4, learning using a frame to which a label is added by the label adding unit 125 as a correct answer label can be performed. In addition, learning may be performed by another learning method using a frame to which a label is added by the label adding unit 125 as teacher data.

The relearning unit 126 may perform learning using N frames as a data set, or may perform learning using data sets of the number of frames larger than N accumulated by performing processing of N frames a plurality of times. The application range of the present technology is not limited by the manner of learning here.

In the case of the above example, the person H31 is detected as a car in the frame F3 (FIG. 7), but tracking and labeling are performed, so that the person H31 can be labeled as a person. By performing learning using frames with such accurate labels, it is possible to generate a recognizer capable of reducing erroneous recognition of the person H31 as a car when an image like the frame F3 is processed.

Furthermore, in the frame F2 (FIG. 6) and the frame F1 (FIG. 5), the person H21 and the person H11 are not detected, but tracking and labeling are performed, so that the person H21 and the person H11 can be labeled as a person. By performing the learning using the frame to which such a label is added, it is possible to generate a recognizer capable of reducing the situation where the person H21 or the person H11 cannot be detected when an image like the frame F2 or the frame F1 is processed.

In step S119, the recognizer update unit 127 updates (the learning model of) the recognizer used in the recognition processing unit 122 with the recognizer (the learning model of) on which the learning has been performed by the relearning unit 126. The update may be performed by replacing the recognizer (learning model), or some parameters of the learning model may be replaced.

A mechanism for evaluating the accuracy of the generated recognizer (learning model) may be provided. The accuracy of the generated recognizer may be evaluated, and the recognizer may be updated only when it is determined that the recognition performance is improved.

In this manner, labeling is performed by performing tracking in which the time goes back to the past direction from the frame detected with high accuracy. The recognizer is updated by performing learning using the labeled frame. By performing such learning, it is possible to perform learning using a frame in which an object that has been erroneously detected is correctly labeled and a frame in which an object that has not been detected is detected and labeled, and thus it is possible to generate a recognizer with improved recognition accuracy.

<Configuration of Information Processing System>

The processing performed by the information processing device 110 in the above-described embodiment can be shared and performed by a plurality of devices.

Although the information processing device 110 in the above-described implementation is a case where the information processing device 110 itself includes a learning device that performs relearning, the learning device may be included in another device.

Here, the description will be continued by taking, as an example, a case where processing is shared and performed by two of the information processing device and the server.

Figure 15:
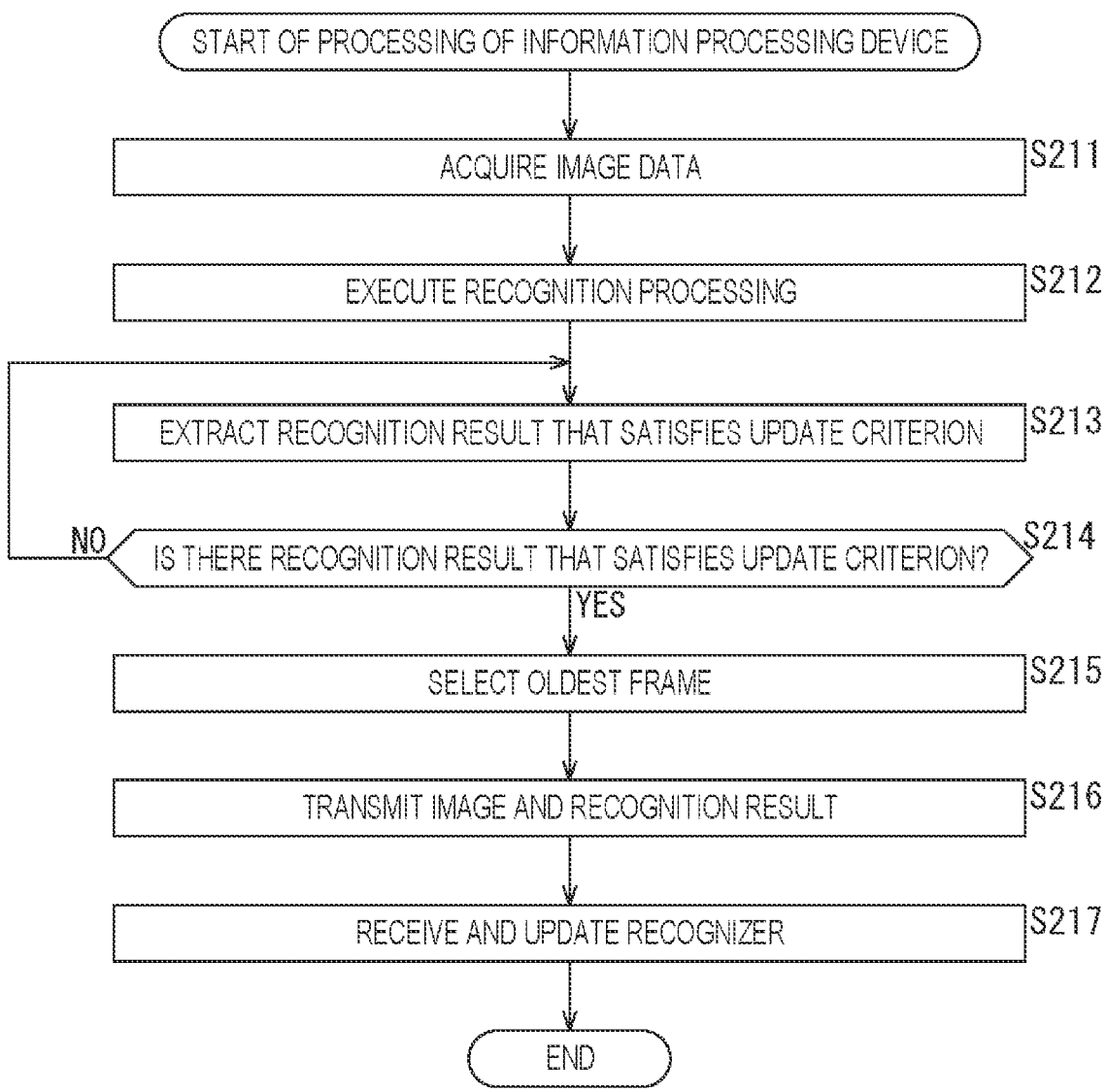
FIG. 15 is a flowchart for describing an operation of the information processing device.

FIG. 15 is a diagram illustrating a configuration of one embodiment of an information processing system. An information processing system 200 includes an information processing device 211 and a server 212. The information processing device 211 is, for example, an in-vehicle device. The server 212 is a device that exchanges data with the information processing device 211 via a predetermined network.

The information processing device 211 includes an image acquisition unit 221, a recognition processing unit 222, an extraction unit 223, a data transmission unit 224, a recognizer reception unit 225, and a recognizer update unit 226. The server 212 includes a data reception unit 231, a recognition target tracking unit 232, a label adding unit 233, a relearning unit 234, and a recognizer transmission unit 235.

The image acquisition unit 221, the recognition processing unit 222, the extraction unit 223, and the recognizer update unit 226 of the information processing device 211 are functions respectively corresponding to the image acquisition unit 121, the recognition processing unit 122, the extraction unit 123, and the recognizer update unit 127 of the information processing device 110 (FIG. 3). The recognition target tracking unit 232, the label adding unit 233, and the relearning unit 234 of the server 212 are functions respectively corresponding to the recognition target tracking unit 124, the label adding unit 125, and the relearning unit 126 of the information processing device 110 (FIG. 3).

<Processing of Information Processing System>

The processing of the information processing system 200 illustrated in FIG. 14 will be described with reference to the flowcharts illustrated in FIGS. 15 and 16. The processing performed by the information processing system 200 is basically similar to the processing performed by the information processing device 110, and since the processing performed by the information processing device 110 has already been described with reference to the flowchart illustrated in FIG. 11, description of similar processing is appropriately omitted.

FIG. 15 is a flowchart for describing processing of the information processing device 211. Since the processing of steps S211 to S215 is similar to the processing of steps S111 to S115 (FIG. 11), the description thereof will be omitted.

In step S216, the image and the recognition target are transmitted to the server 212. The data transmission unit 224 of the information processing device 211 transmits at least the data regarding the recognition target extracted by the extraction unit 223, the oldest frame, and the data of N frames in the past from the oldest frame. The vehicle speed, the frame rate, and the like may also be transmitted as necessary.

The server 212 performs relearning and transmits the recognizer after the relearning to the information processing device 211. In step S217, the recognizer reception unit 225 of the information processing device 211 receives the recognizer transmitted from the server 212, and the recognizer update unit 226 updates the recognizer of the recognition processing unit 222 with the received recognizer.

Figure 16:
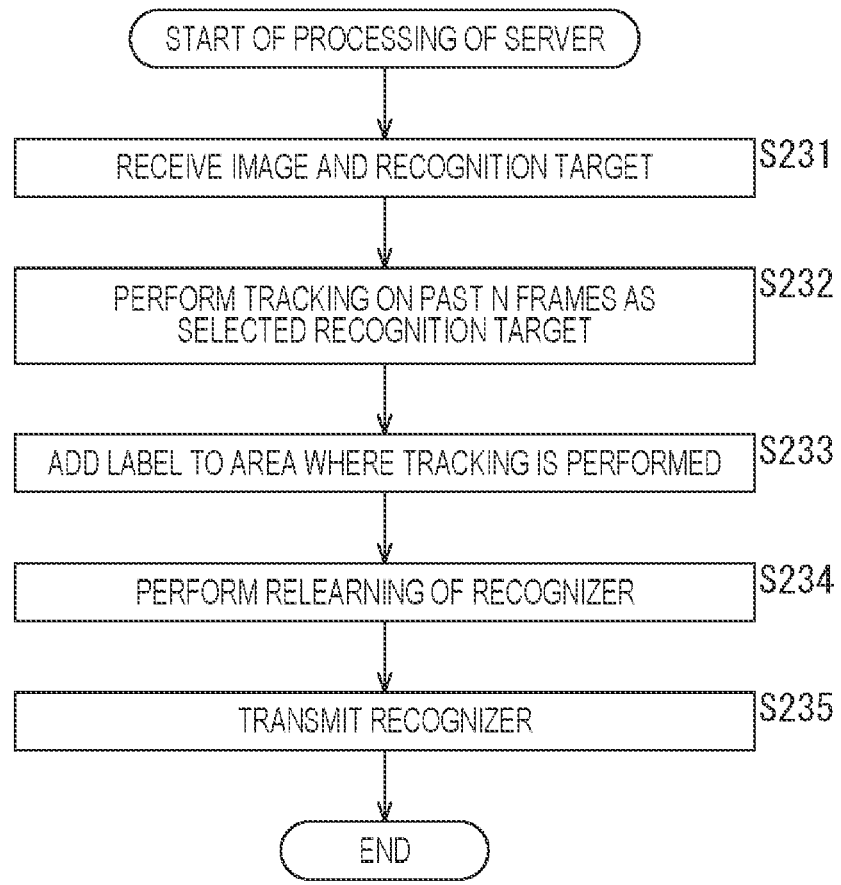
FIG. 16 is a flowchart for describing an operation of a server.

FIG. 16 is a flowchart for describing processing of the server 212.

In step S231, the data reception unit 231 of the server 212 receives the image (frame) and the data of the recognition target transmitted by the data transmission unit 224 of the information processing device 211. Since steps S232 to S234 are similar to the processing of steps S116 to S118 (FIG. 11), the detailed description thereof will be omitted.

The server 212 performs processing of performing tracking by tracing back the frame in the past direction, performing labeling, and relearning the recognizer which have been performed by the information processing device 110. The recognizer on which the relearning has been performed in this manner is transmitted from the recognizer transmission unit 245 of the server 212 to the information processing device 211 in step S235.

In this manner, processing may be shared and performed by the information processing device 211 and the server 212.

<Another Configuration of Information Processing System>

Figure 17:
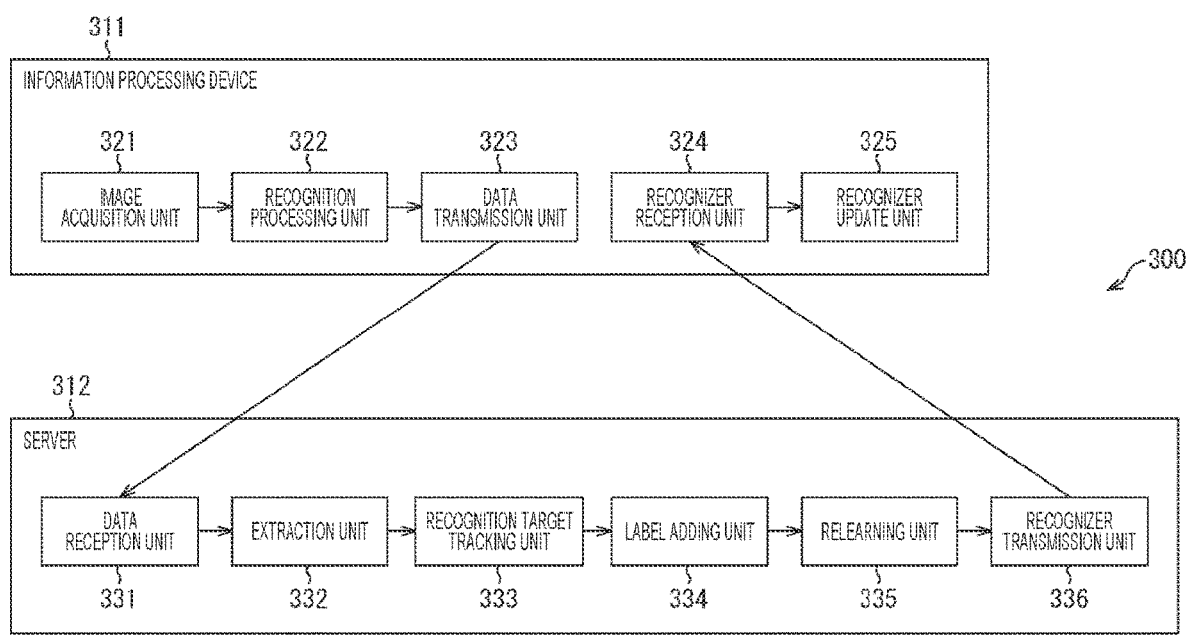
FIG. 17 is a diagram illustrating a configuration of an information processing system.

FIG. 17 is a diagram illustrating another configuration example of the information processing system. An information processing system 300 illustrated in FIG. 17 includes an information processing device 311 and a server 312.

The information processing device 311 includes an image acquisition unit 321, a recognition processing unit 322, a data transmission unit 323, a recognizer reception unit 324, and a recognizer update unit 325. The server 312 includes a data reception unit 331, an extraction unit 332, a recognition target tracking unit 333, a label adding unit 334, a relearning unit 335, and a recognizer transmission unit 336.

The image acquisition unit 321, the recognition processing unit 322, and the recognizer update unit 325 of the information processing device 311 are functions respectively corresponding to the image acquisition unit 121, the recognition processing unit 122, and the recognizer update unit 127 of the information processing device 110 (FIG. 3). The extraction unit 332, the recognition target tracking unit 333, the label adding unit 334, and the relearning unit 335 of the server 312 are functions respectively corresponding to the extraction unit 123, the recognition target tracking unit 124, the label adding unit 125, and the relearning unit 126 of the information processing device 110 (FIG. 3).

Figure 14:
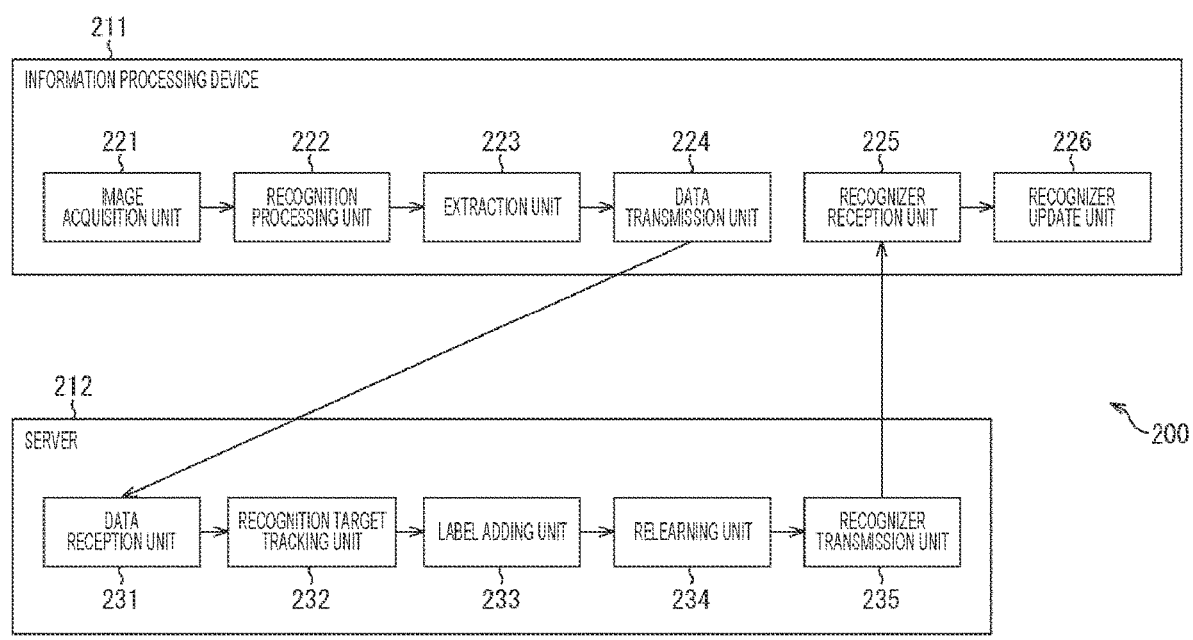
FIG. 14 is a diagram illustrating a configuration of the information processing system.

In a case where the information processing system 300 illustrated in FIG. 17 is compared with the information processing system 200 illustrated in FIG. 14, a configuration in which the extraction unit 223 of the information processing device 211 of the information processing system 200 is provided on the server 212 side is the configuration of the information processing system 300.

<Other Processing of Information Processing System>

Figure 18:
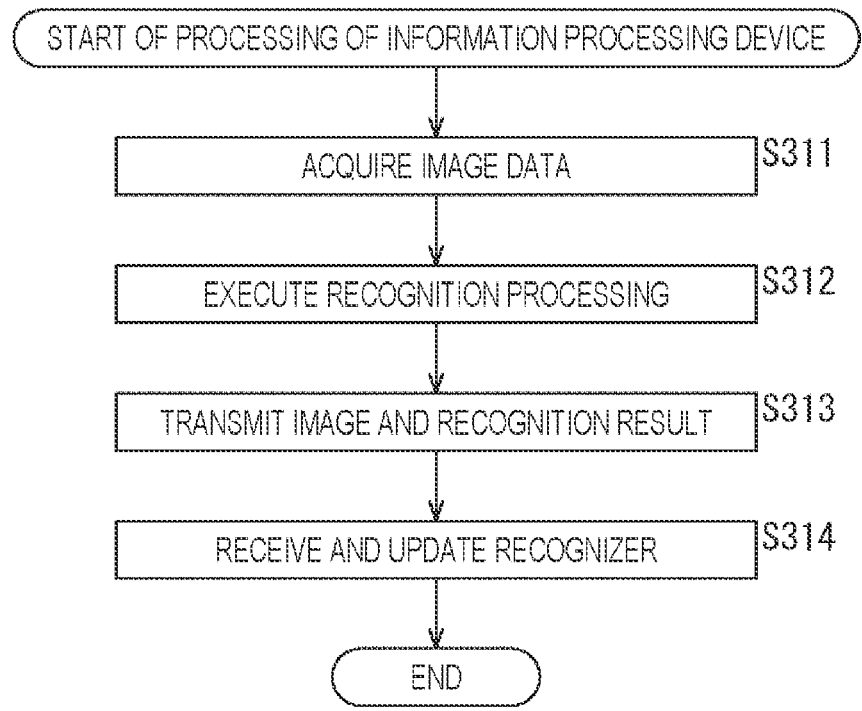
FIG. 18 is a flowchart for describing an operation of the information processing device.

The processing of the information processing system 300 illustrated in FIG. 17 will be described with reference to the flowcharts illustrated in FIGS. 18 and 19. The processing performed by the information processing system 300 is basically similar to the processing performed by the information processing device 110, and since the processing performed by the information processing device 110 has already been described with reference to the flowchart illustrated in FIG. 11, description of similar processing is appropriately omitted.

FIG. 17 is a flowchart for describing processing of the information processing device 311. Since the processing of steps S311 and S312 is similar to the processing of steps S111 and S112 (FIG. 11), the description thereof will be omitted.

In step S313, the data transmission unit 323 of the information processing device 311 transmits the image and the recognition result to the server 312. The data transmission unit 323 of the information processing device 311 transmits at least data and a frame related to the recognition result recognized by the recognition processing unit 322. A mechanism for transmitting a vehicle speed, a frame rate, and the like as necessary may be employed.

Note that the image and the recognition result may be transmitted every time one frame is processed, or may be transmitted together for several frames.

The server 312 side performs relearning and transmits the recognizer after the relearning to the information processing device 311. In step S314, the recognizer reception unit 324 of the information processing device 311 receives the recognizer transmitted from the server 312, and the recognizer update unit 325 updates the recognizer of the recognition processing unit 322 with the received recognizer.

Figure 19:
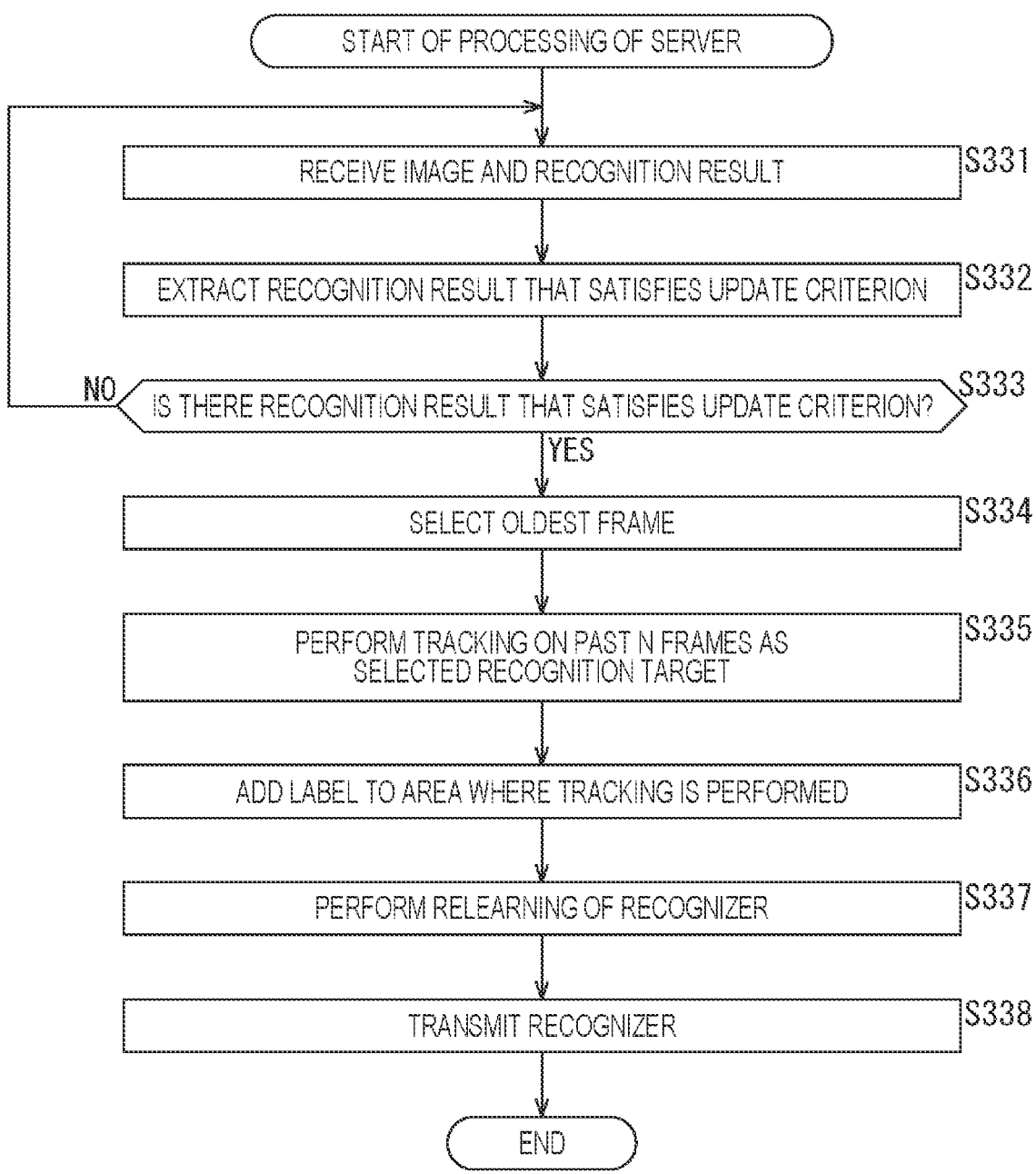
FIG. 19 is a flowchart for describing an operation of the server.
Figure 20:
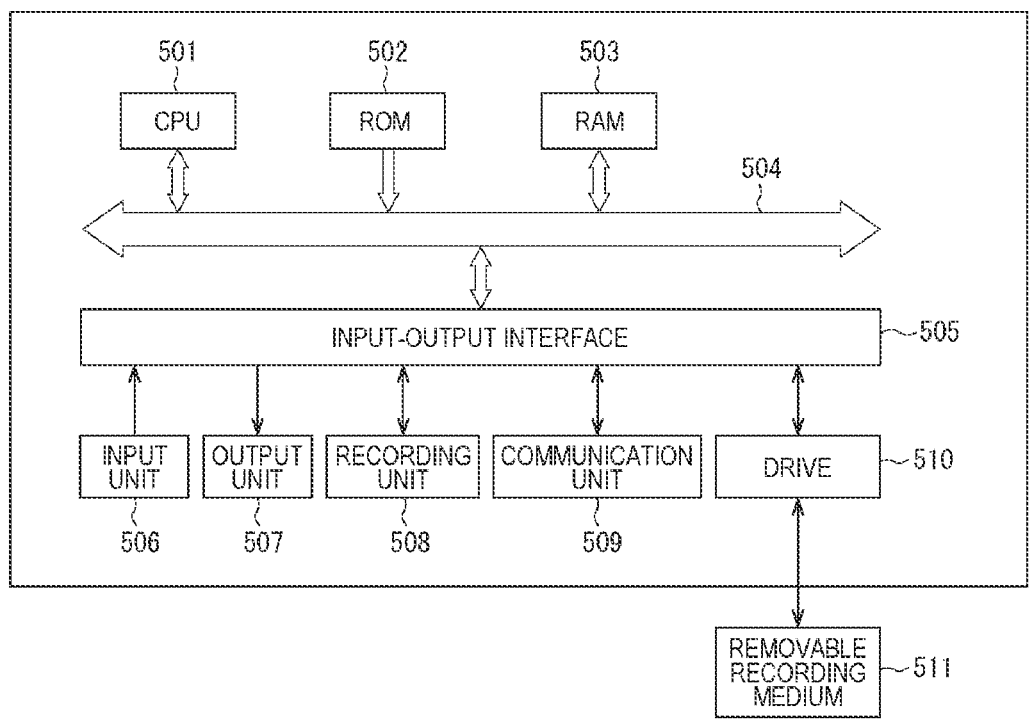
FIG. 20 is a diagram illustrating a configuration example of a personal computer.

FIG. 19 is a flowchart for describing processing of the server 312.

In step S331, the data reception unit 331 of the server 312 receives the image (frame) and the recognition result data transmitted by the data transmission unit 323 of the information processing device 311. In step S332, the extraction unit 332 extracts a recognition target that satisfies the update criterion. Since the processing of steps S332 to S337 is similar to the processing of steps S113 to S118 (FIG. 11), the detailed description thereof will be omitted.

The server 312 performs processing of extracting the recognition target, tracking by tracing back the frame in the past direction, performing labeling, and relearning the recognizer which have been performed by the information processing device 110. The recognizer on which the relearning has been performed in this manner is transmitted from the recognizer transmission unit 336 of the server 312 to the information processing device 311 in step S338.

In this manner, the information processing device 311 and the server 312 may be configured to share and perform processing.

By configuring the server 212 (312) to perform the learning processing as in the information processing system 200 and the information processing system 300, the processing of the information processing device 211 (311) can be reduced.

The server 212 (312) may be configured to collect data from the plurality of information processing devices 211 (311) and generate a recognizer (perform relearning of the recognizer) using the data from the plurality of information processing devices 211 (311). By handling a large amount of data and learning the recognizer, it is possible to obtain a recognizer with improved accuracy at an earlier stage.

In the above-described embodiment, the information processing device that processes an image from a camera mounted on a vehicle has been described as an example, but the present invention can also be applied to an information processing device that processes an image from a monitoring camera and the like.

In the above-described embodiment, a case where an image captured by a camera is processed has been described as an example, but the image may be a distance measurement image acquired by a time-of-flight (ToF) method. By using a thermal sensor, data obtained from the thermal sensor may be handled as an image, and a predetermined object such as a person or a car may be recognized. The present technology can be widely applied to a case where a predetermined object is recognized using data obtained from a sensor.

The present technology can also be applied to a case where specifications defined by Network of Intelligent Camera Ecosystem (NICE) Alliance are applied.

<Recording Medium>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

FIG. 50 is a block diagram illustrating a configuration example of hardware of a computer that executes the above-described series of processes by a program. In the computer, a central processing unit (CPU) 501, a read only memory (ROM) 502, and a random access memory (RAM) 503 are mutually connected by a bus 504. An input-output interface 505 is further connected to the bus 504. An input unit 506, an output unit 507, a storage unit 508, a communication unit 509, and a drive 510 are connected to the input-output interface 505.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes, for example, a network interface and the like. The drive 510 drives a removable medium 511 such as a magnetic disk, an optical disk, a magneto-optical disk, or a semiconductor memory.

In the computer configured as described above, for example, the CPU 501 loads the program stored in the storage unit 508 into the RAM 503 via the input-output interface 505 and the bus 504 and executes the program, to thereby perform the above-described series of processing.

The program executed by the computer (CPU 501) can be provided by being recorded on, for example, a removable medium 511 as a package medium or the like. Furthermore, the program can be provided via a wired or wireless transmission medium such as a local area network, the Internet, or digital satellite broadcasting.

In the computer, the program can be installed in the storage unit 508 via the input-output interface 505 by mounting the removable medium 511 to the drive 510. Furthermore, the program can be received by the communication unit 509 via a wired or wireless transmission medium and installed in the storage unit 508. In addition, the program can be installed in the ROM 502 or the storage unit 508 in advance.

Note that the program executed by the computer may be a program for processing in time series in the order described in the present description, or a program for processing in parallel or at a necessary timing such as when a call is made.

Furthermore, in the present description, the system represents the entire device including a plurality of devices.

Note that the effects described herein are merely examples and are not limited, and other effects may be provided.

Note that the embodiments of the present technology are not limited to the above-described embodiments, and various modifications are possible without departing from the gist of the present technology.

Note that the present technology can have configurations as follows.

(1)

A learning model generation method, including:
  tracking a target object in a reverse direction in time series, the target object being recognized by recognition processing using a recognizer to which a learning model for performing recognition processing on input data is applied; and
  performing relearning of the learning model by using data generated on the basis of a result of the tracking.

(2)

The learning model generation method according to (1) above, in which
  the data is generated by tracking the target object in the reverse direction in time series and adding a label to the target object tracked.

(3)

The learning model generation method according to (1) or (2) above, in which
  a recognition result that satisfies a predetermined criterion among recognition results obtained by recognition processing on a frame captured at a first time is set as the target object to be a target of the tracking,
  the target object captured in a plurality of frames captured at a time before the first time is tracked, and
  a label is added to the target object in a case where the target object is detected in a frame as a result of the tracking.

(4)

The learning model generation method according to (3) above, in which
  the recognition result that has been detected in which a size of the recognition result with respect to a size of the frame is equal to or larger than a predetermined ratio is assumed as the recognition result that satisfies the predetermined criterion and is set as the target object.

(5)

The learning model generation method according to (4) above, in which
  the ratio differs depending on a label added to the recognition result.

(6)

The learning model generation method according to any one of (3) to (5) above, in which
  the recognition result at a position separated from a side of the frame by a predetermined distance or more is assumed as the recognition result that satisfies the predetermined criterion and is set as the target object.

(7)

The learning model generation method according to any one of (3) to (6) above, in which
frames captured from the first time to a second time before the first time including a frame captured at the first time are set as the target of the tracking.

(8)

The learning model generation method according to any one of (3) to (6) above, in which
the recognition result detected over a plurality of frames is assumed as the recognition result that satisfies the predetermined criterion and is set as the target object.

(9)

The learning model generation method according to any one of (3) to (6) and (8) above, in which
in a case where the recognition result detected in frames captured from the first time to a second time before the first time is set as the target object, frames captured from the second time to a third time before the second time are set as the target of the tracking.

(10)

The learning model generation method according to (8) above, in which
a number of the plurality of frames is set to be different depending on a vehicle speed.

(11)

The learning model generation method according to any one of (1) to (10) above, in which
the learning model on which the relearning has been performed is transmitted to another device.

(12)

The learning model generation method according to any one of (1) to (11) above, in which
learning on the learning model is performed by machine learning.

(13)

An information processing device, including
a relearning unit that tracks a target object recognized by recognition processing using a recognizer in a reverse direction in time series, and performs relearning of a learning model of the recognizer on the basis of learning data for relearning of the recognizer generated on the basis of a result of the tracking.

(14)

The information processing device according to (13) above, in which
the learning data is data generated by adding a label to the tracked target object.

(15)

The information processing device according to (13) or (14) above, in which
a recognition result that satisfies a predetermined criterion is extracted as the target object to be the target of the tracking among recognition results obtained by recognition processing on a frame captured at a predetermined time.

(16)

The information processing device according to any one of (13) to (14) above, in which
the recognizer is updated with the learning model on which the relearning has been performed.

(17)

An information processing system, including:
a recognition processing unit that performs recognition processing using a recognizer to which a learning model for performing recognition processing on input data is applied;
an extraction unit that extracts a recognition result that satisfies a predetermined criterion among recognition results recognized by the recognition processing unit;
a tracking unit that sets the recognition result extracted by the extraction unit as a target object and tracks the target object in a reverse direction in time series;
a label adding unit that adds a label to the target object tracked by the tracking unit;
a relearning unit that performs relearning of the learning model by using the label added by the label adding unit; and
an update unit that updates the recognizer of the recognition processing unit with the learning model of which the relearning has been performed by the relearning unit.

(18)

The information processing system according to (17) above, further including
a first device and a second device, in which
the first device includes the recognition processing unit and the update unit, and
the second device includes the extraction unit, the tracking unit, the label adding unit, and the relearning unit.

(19)

The information processing system according to (18) above, in which
the second device receives data from a plurality of the first devices and performs relearning of the recognizer using a plurality of pieces of data.

REFERENCE SIGNS LIST

110 Information processing device
121 Image acquisition unit
122 Recognition processing unit
123 Extraction unit
124 Recognition target tracking unit
125 Label adding unit
126 Relearning unit
127 Recognizer update unit
134 Recognition target tracking unit
200 Information processing system
211 Information processing device
212 Server
213 Label adding unit
221 Image acquisition unit
222 Recognition processing unit
223 Extraction unit
224 Data transmission unit
225 Recognizer reception unit
226 Recognizer update unit
231 Data reception unit
232 Recognition target tracking unit
234 Relearning unit
245 Recognizer transmission unit
300 Information processing system
311 Information processing device
312 Server
321 Image acquisition unit
322 Recognition processing unit
323 Data transmission unit
324 Recognizer reception unit
325 Recognizer update unit
331 Data reception unit
332 Extraction unit
333 Recognition target tracking unit
334 Label adding unit 335 Relearning unit
336 Recognizer transmission unit

The invention claimed is:

1. A learning model generation method, comprising:
tracking a target object in a reverse direction in time series, wherein
the target object is set based on a recognition result that satisfies a specific criterion among a plurality of recognition results,
the plurality of recognition results is based on recognition processing on a frame captured at a first time,
the target object is set as a target of the tracking,
the target object is recognized by the recognition processing using a recognizer to which a learning model for executing the recognition processing on input data is applied,
the target object captured in a plurality of frames is tracked,
the plurality of frames is captured at a time prior to the first time, and
a label is added to the target object in a case where the target object is detected in a frame of the plurality of frames as a result of the tracking;
generating data based on the result of the tracking; and
executing relearning of the learning model based on the generated data.

2. The learning model generation method according to claim 1, wherein
the data is generated by tracking the target object in the reverse direction in the time series and adding the label to the target object.

3. The learning model generation method according to claim 1, wherein
the recognition result, in which a size of the recognition result with respect to a size of the frame is equal to or larger than a specific ratio, is set as the recognition result that satisfies the specific criterion and is set as the target object.

4. The learning model generation method according to claim 3, wherein
the specific ratio differs based on the label that is added to the recognition result.

5. The learning model generation method according to claim 1, wherein
the recognition result at a position separated from a side of the frame by at least a specific distance is set as the recognition result that satisfies the specific criterion and is set as the target object.

6. The learning model generation method according to claim 1, wherein
a second plurality of frames captured from the first time to a second time including the frame captured at the first time is set as the target object, wherein the second time is prior to the first time.

7. The learning model generation method according to claim 1, wherein
the recognition result detected over a second plurality of frames is set as the recognition result that satisfies the specific criterion and is set as the target object.

8. The learning model generation method according to claim 7, wherein
a number of the second plurality of frames is set based on a vehicle speed.

9. The learning model generation method according to claim 1, wherein
in a case where the recognition result detected in a second plurality of frames captured from the first time to a second time before the first time is set as the target object, a third plurality of frames captured from the second time to a third time is set as the target of the tracking, wherein the third time is before the second time.

10. The learning model generation method according to claim 1, wherein
the learning model, on which the relearning is executed, is transmitted to an external device.

11. The learning model generation method according to claim 1, wherein
learning on the learning model is executed by machine learning.

12. An information processing device, comprising:
a recognition processing unit configured to execute a recognition process to output a plurality of recognition results using a recognizer;
an extraction unit configured to extract a recognition result that satisfies a specific criterion from the plurality of recognition results, wherein
the plurality of recognition results is recognized by the recognition processing unit at a specific time;
a tracking unit configured to:
set the recognition result extracted by the extraction unit as a target object, and
track the target object in a reverse direction in time series, wherein
the target object captured in a plurality of frames is tracked, and
the plurality of frames is captured at a time prior to the specific time;
a label adding unit configured to add a label to the target object, wherein
the label is added in a case where the target object is detected in a frame of the plurality of frames as a result of the tracking of the target object; and
a relearning unit configured to:
generate learning data based on the result of the tracking of the target object; and
execute performs-relearning of a learning model of the recognizer based on the learning data.

13. The information processing device according to claim 12, wherein
the recognizer is updated with the learning model of which the relearning has been executed.

14. An information processing system, comprising:
a recognition processing unit configured to execute a recognition process to output a plurality of recognition results using a recognizer, wherein a learning model is applied to the recognizer to execute the recognition process on input data;
an extraction unit configured to extract a recognition result that satisfies a specific criterion from the plurality of recognition results, wherein the plurality of recognition results is recognized by the recognition processing unit at a specific time;
a tracking unit configured to:
set the recognition result extracted by the extraction unit as a target object, and
track the target object in a reverse direction in time series, wherein
the target object captured in a plurality of frames is tracked, and
the plurality of frames is captured at a time prior to the specific time;
a label adding unit configured to add a label to the target object that is tracked by the tracking unit, wherein the label is added in a case where the target object is detected in a frame of the plurality of frames as a result of the tracking of the target object;

a relearning unit configured to execute relearning of the learning model based on the label added by the label adding unit; and an update unit configured to update the recognizer of the recognition processing unit with the learning model, wherein the relearning of the learning model is executed by the relearning unit.

15. The information processing system according to claim 14, further comprising:

a first device and a second device, wherein
the first device includes the recognition processing unit and the update unit, and
the second device includes the extraction unit, the tracking unit, the label adding unit, and the relearning unit.

16. The information processing system according to claim 15, wherein the second device is configured to:
receive a plurality of pieces of data from a plurality of first devices including the first device, and
execute the relearning of the recognizer using the plurality of pieces of data from the plurality of the first devices.

* * * * *